Jan. 1, 1952 A. P. TAYLOR 2,580,861

RECORD FEEDING DEVICE

Filed May 28, 1946 14 Sheets-Sheet 1

INVENTOR
Alton P. Taylor

Jan. 1, 1952 A. P. TAYLOR 2,580,861

RECORD FEEDING DEVICE

Filed May 28, 1946 14 Sheets-Sheet 2

INVENTOR
Alton P. Taylor

INVENTOR
Alton P. Taylor

Jan. 1, 1952

A. P. TAYLOR 2,580,861

RECORD FEEDING DEVICE

Filed May 28, 1946

14 Sheets-Sheet 4

INVENTOR
Alton P. Taylor

INVENTOR
Alton P. Taylor

INVENTOR
Alton P. Taylor

INVENTOR
Alton P. Taylor

Jan. 1, 1952 A. P. TAYLOR 2,580,861

RECORD FEEDING DEVICE

Filed May 28, 1946 14 Sheets-Sheet 8

INVENTOR
Alton P. Taylor

INVENTOR
Alton P. Taylor

Jan. 1, 1952 A. P. TAYLOR 2,580,861

RECORD FEEDING DEVICE

Filed May 28, 1946 14 Sheets-Sheet 10

INVENTOR
Alton P. Taylor

Jan. 1, 1952 A. P. TAYLOR 2,580,861

RECORD FEEDING DEVICE

Filed May 28, 1946 14 Sheets-Sheet 11

INVENTOR
Alton P. Taylor

INVENTOR
Alton P. Taylor

INVENTOR
Alton P. Taylor

FIG 6. l.
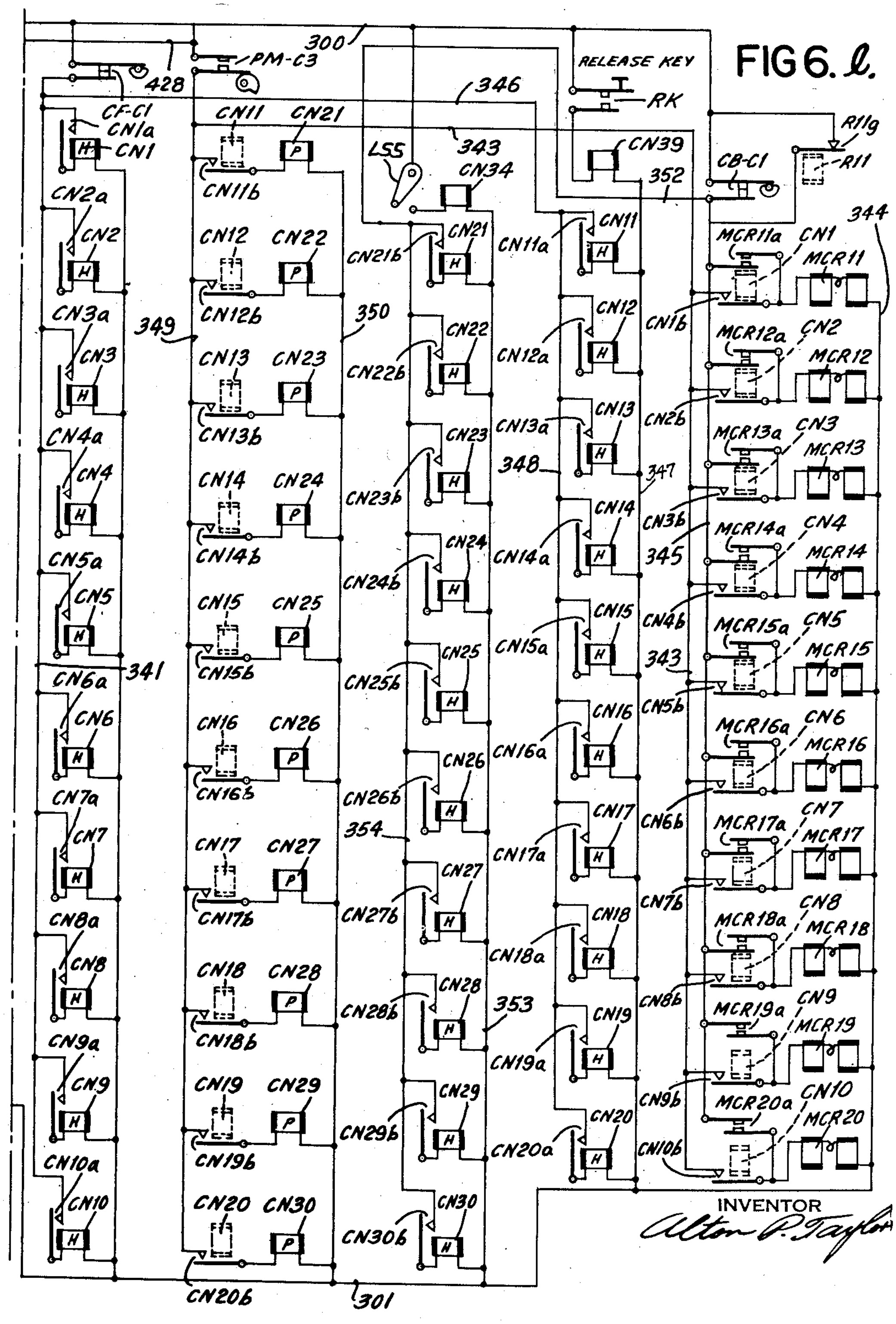
INVENTOR
Alton P. Taylor

Patented Jan. 1, 1952 2,580,861

UNITED STATES PATENT OFFICE 2,580,861

RECORD FEEDING DEVICE

Alton P. Taylor, Nichols, N. Y., assignor to International Business Machines Corporation, New York, N. Y., a corporation of New York Application May 28, 1946, Serial No. 674,132

21 Claims. (Cl. 235—61.9)

This invention is concerned with record spacing devices and more particularly with the selection of print receiving lines on a record sheet according to code or group numbers on perforated tabulator control cards.

An object of the invention is the provision of means for controlling sheet feeding means so that a predetermined line of a sheet is reserved for printing a record of a selected item or group of data. The record cards are arranged in groups and the numbers of said groups are selected to have a predetermined relationship with the lines of the record sheet, so that certain groups are recorded on certain lines. For example, the amount or total of group 9 can be recorded on line 11, group 6 can be recorded on line 12 and the amount of group 41 can be recorded on line 13 and the amount of group 5 can be recorded on line 24. In other words, there is no fixed sequential or other relationship between the code or group numbers and the line positions. The line positions are selected in progressive order down the sheet, but there is no fixed sequence of line selection. Then, too, the groups of cards are arranged so the first group to be recorded is sensed first, but the code numbers of the first and following groups are chosen arbitrarily and not necessarily in sequential order.

Therefore, another object of the invention is the provision of recording and sheet feeding means of such flexibility that any data can be recorded on any preselected line.

A still further object of the invention is the provision of electrical line selection controls associated with code or group number sensing controls so that any predetermined number sensed by the latter may be selective of any predetermined line position under control of the former.

Another object of the invention is the provision of a plural ordered code number sensing device for setting up a plural denomination set of pluggable contacts, which contacts can be individually connected to any one of a plural denominational set of line selection contacts also pluggable and made effective seriatim by stepping relays as a sheet is advanced for recording. A feature of the invention is an interlock for delaying or suspending line spacing while a stepping relay is reset.

Another object of the invention is the provision of line selection devices operated under control of multiple card group change detection devices. The cards can be arranged in groups according to minor, intermediate and major groups and upon a change in any one or all of said groups a selected line position can be brought into position for total recording.

Another object of the invention is the provision of sheet ejection controls operable either automatically by reaching a predetermined line of the sheet, or manually by depression of a key at any time. A feature of the ejection control is the automatic restoration of line selection stepping relays upon an eject cycle.

Other objects of the invention will be pointed out in the following description and claims and illustrated in the accompanying drawings, which disclose, by way of example, the principle of the invention and the best mode, which has been contemplated, of applying that principle.

Figs. 6*a*–6*l* are a wiring diagram of the alphabet tabulator with the novel controls shown in heavy lines in Figs. 6*a* to 6*h*. Figs. 6*i* to 6*l* relate entirely to new electrical controls for line selection.

The invention is disclosed as embodied in an alphabet printing tabulator of the kind shown generally in United States Patents 2,079,418 and 2,199,547 and application Serial No. 609,854, filed August 9, 1945, now Patent No. 2,531,885, corresponding to British Patent 618,267, issued February 18, 1949. An automatic carriage or record sheet spacing and ejecting mechanism of the kind shown in United States Patent 2,189,025 is associated with the platen of the tabulator. These machines are controlled by perforated record cards of the kind shown in Fig. 1 and the purpose is to accumulate the amounts represented by the group of related records and to control thereby printing of bill forms or other accounting records, such as the sheet shown in Fig. 2.

Heretofore, the placement of printing impressions was limited to sequential order of line speeing or ejecting operations, wherein the impressions appear at regular intervals down the sheet, but by means of the provisions of the present invention flexible arrangements of recordings are possible as noted on the sample sheet.

*The controlling record cards*

The perforated record used to control the tabulator is of the regular Hollerith form, wherein twelve digit and alphabet indicia positions are aligned in each one of eighty columns extending across the card. In each column the lower nine index points are used for digit representations when perforated alone. For alphabet designations, the combination of one of these nine positions is punched along with one of the three upper positions designated 0, 11 and 12.

A number of the card columns are usually devoted to representations of a group number (such as the perforations "09" in the card C of Fig. 1) to differentiate between the cards of different accounts or some other accounting classification. The card in other portions carries the perforation representations of name, address, amount, etc.

*The record sheet*

Figures 1, 2, 3:
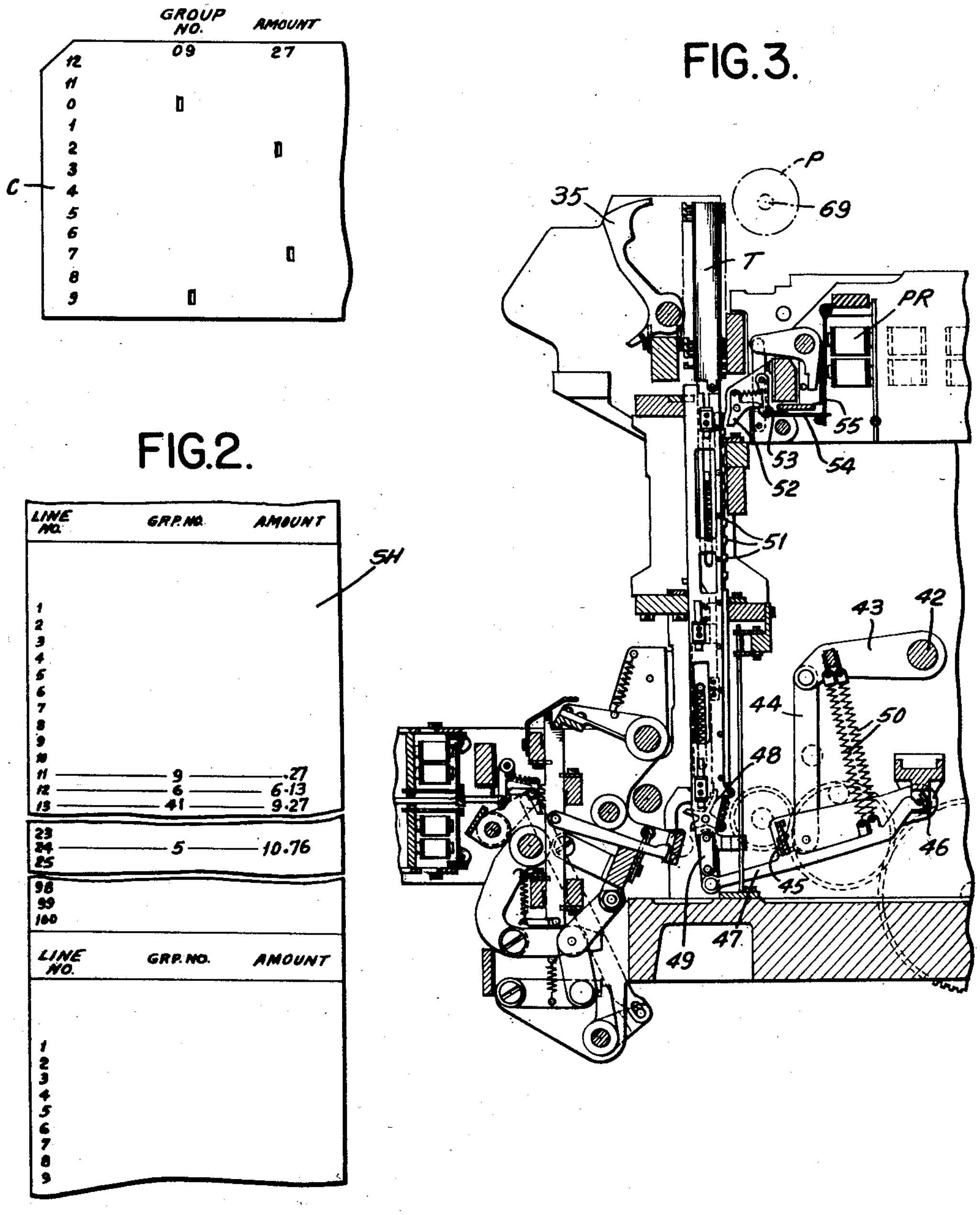
Fig. 1 shows a sample record card.
Fig. 2 shows a portion of a printed record sheet.
Fig. 3 is a sectional view taken through the printing mechanism.

In Fig. 2 is shown a sample of a record sheet printed in accordance with the special controls exercised by the devices in the present invention. On this sheet it is noted that the relationship between the group number recordings and line positions upon which they appear are unusual in that there is no regular order or sequence with respect to either of the controls. In other words, the group number recordings do not follow any fixed sequence, and the line positions have no customary arrangement. Because of the special controls provided in the machine, it is possible that the item of group 9 is recorded on line 11, and the amount of group 6 is recorded on line 12, and the amount of group 41 is recorded on line 13, and the amount of group 5 is recorded on line 24. It is obvious from the haphazard arrangement of the group numbers and line positions that there is no fixed relationship between the two. The arrangement is that predetermined by the operator for some special accounting reason, and the only limitation on the selection is that the cards, singly or in groups, must appear in the order that the related data is to be recorded down the sheet.

*The printing mechanism*

The printing impressions shown on sheet SH of Fig. 2 are recorded by means of printing devices such as those disclosed in Patent 2,016,682. A brief description of these devices with reference to Fig. 3 is believed to suffice for the purpose of explaining herein how amounts of various groups are recorded on predetermined lines.

The type head T is provided with a plurality of type elements upon which the digit and alphabetic characters are arranged in four zones; one zone having the digit type and the other three zones having alphabet type which are selected by combinations of card perforations 0, 11 or 12 with the digit perforations.

Head T is controlled to move past the print receiving line of platen P in synchronism with the movement of the card C past the lower card sensing brushes. As the 9, 8, 7, etc. perforation positions are sensed, the 9, 8, 7, etc. type are in printing position and one will be held at the printing position to receive a hammer blow depending upon the perforation position.

Between the main operating shaft of the machine and the printer there extends a train of gearing, the printer clutch and cams for oscillating the type bar operating shaft 42 (Fig. 3). This shaft carries arms 43 which have depending link connections 44 with a bail 45 pivoted at 46. Also pivoted at 46 are type carrier actuating arms 47 which are connected at their free ends to the lower extremities of type carriers 48 through a link connection 49. Arms 47 are urged in a clockwise direction by springs 50 which are connected at their upper ends to a cross bar extending between arms 43. Thus, as the arms 43 and bail 45 are rocked in a clockwise direction through the action of the main operating mechanism, the springs 50 will rock the arms 47 in the same direction and will cause elevation of the type carriers 48 which are suitably mounted for vertical movement. Each carrier 48 is provided with a series of stops 51 which are representative of 9 to 0 in a descending order and which represent corresponding index point positions on the record card C. As the type bar 48 is moved upwardly, the stops 51 move past a stopping pawl 52 in succession. Pawl 52 is held in position by a latch 53 which has a link connection 54 with an armature 55 of print magnet PR.

Energization of magnet PR will trip latch 53 to permit pawl 52 to rock into engagement with the type carrier under the influence of its spring and engage one of the stops 51 to interrupt upward movement of the type carrier. When a type bar is used to print numerical characters, it will be controlled by a column of the record card which contains but a single perforation, and for such operation the type head T and and carrier 48 are held together and not adjusted relatively for zoning. As the card is passing the lower sensing brushes, a circuit completed through the sensed perforation will energize magnet PR and will trip pawl 52 into engagement with the stop 51 corresponding to the location of the perforation in the card. This will result in the presentation of the corresponding digit type element at the printing line for recording by action of hammer 35.

When alphabetical characters are to be printed, the type head T will be displaced upwardly one, two, or three steps with respect to carrier 48 as controlled by special code perforations 0, 11 or 12 in the card. Since the alphabet characters are in the three type zones so selected, it is possible to print headings, names, addresses, dates, etc. on the record sheet.

*Sheet spacing and feeding devices*

Record sheet SH (Fig. 2) is line spaced and ejected from form to form by means of automatic spacing devices, such as those disclosed in Patent 2,189,025. A short explanation of the action of the line spacing and long feed eject devices is believed sufficient for present purposes.

Figure 4:
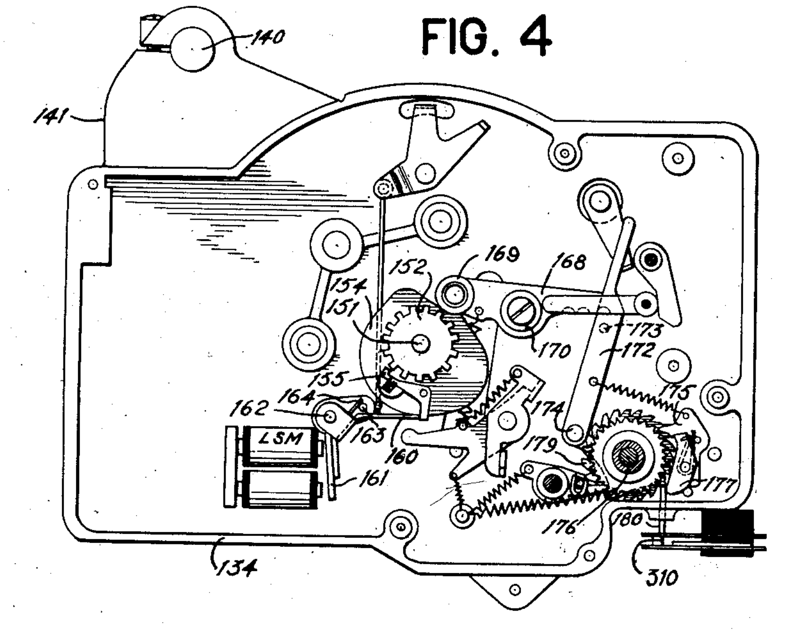
Fig. 4 is a sectional elevation view showing the line spacing mechanism in the automatic carriage.

The automatic platen rotating controls are held in a frame (Fig. 4) comprising a casing 134 with a bracket 141 which supports motor shaft 140. Between motor shaft 140 and a line space drive shaft 151 is a train of gearing to keep the shaft rotating in a clockwise direction. Shaft 151 carries a clutch plate 152 attached thereto. Adjacent the toothed clutch plate 152 is a cam 154 loosely pivoted on shaft 151. This cam carries a clutching pawl 155 pivoted at 156. A compression spring mounted in a stud on cam 154 tends to engage pawl 155 with clutch plate 152 but an extending tail on the pawl is normally obstructed by the end of a lever 160 connected to the armature 161 of the line spacing control magnet LSM. The lever 160 is pivoted on a stud 162 and is urged in a counterclockwise direction against a stop pin 163 by a spring 164.

When the line spacing magnet LSM is energized, the lever 160 is rocked in a clockwise direction releasing the clutch pawl 155 which then engages the clutch plate 152, thus connecting the cam 154 to the driving shaft 151. As cam 154 rotates, it operates a lever 168 through a roller 169 on the lever in cooperation with the periphery of the cam. The lever 168 is pivoted on the stud 170 and is provided with an extending arm. A link 172 placed adjacent the lever 168 carries a pin 173 adapted to cooperate with the extending end of lever 168. The other end of link 172 is pivotally connected at 174 to a line spacing plate 175 loosely mounted on the platen feed shaft 176. The plate 175 carries a feed pawl 177 pivoted on the plate and adapted to cooperate with a ratchet gear 179 fixed to shaft 176 which has gear connections to the shaft 69 of platen P (Fig. 3) for rotating it to advance the sheet SH.

From the connections mentioned, it will be noted that as cam 154 is rotated, the lever 168 is rocked in a clockwise direction pushing link 172 down and rocking the plate 175, so that pawl 177 advances the platen shaft 176 one or more steps in a counterclockwise direction.

For the purposes of the present invention, a pair of normally closed contacts 310 is mounted on the outside of the casing 134 directly under the spacing plate 175. A plunger 180 abuts against the bottom edge of plate 175 and projects downward vertically through a bushing in the casing and presses down on the top blade of contact 310. During a spacing operation, plate 175 is rocked counterclockwise and plunger 180 follows the plate upward as urged by the spring blade. In this way the contact 310 is opened on each spacing operation, and then closed positively by the downward thrust of plunger 180 as forced by the restoration of plate 175. Closure of contacts 310 is used as an impulse initiating means to advance stepping relays in synchronism with line spacing operations.

On certain kinds of records, it is advisable to skip a space between a printed heading and the first printed items or amounts. The heading may be printed under control of one or more perforated record cards such as name and address cards. The last card of each heading group is punched with a special perforation to call in a skipping circuit to initiate successive energizations of the line space magnet LSM to feed the record the required space. In the skipping circuit are contacts which are tripped by a settable cam when the desired space has been skipped.

*Long feed devices*

Figure 5:
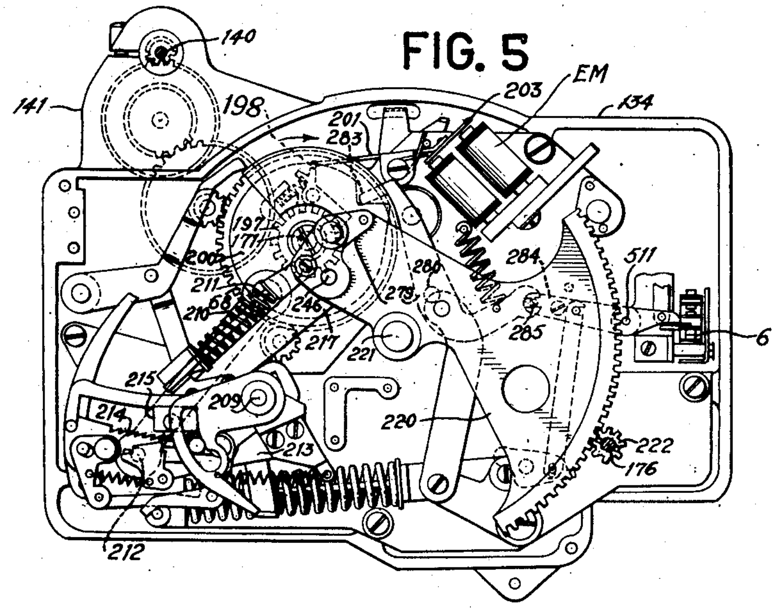
Fig. 5 is a sectional elevation view showing the ejecting mechanism in the automatic carriage.

When the sheet is to be ejected, the ejection control devices of Fig. 5 are called into play for an ejection or long feed operation. The ejection driving connections include a clutch which may be connected at any time in the operation of the machine to cause a sheet ejecting operation of the platen. The driving member of the clutch is the gear 68 driven by a gear train from the motor shaft 140, previously mentioned. Referring to Fig. 5, it is noted that gear 68 is pivoted on stud 171 in the frame and carries attached thereto a toothed clutch plate 197. Loosely pivoted on the same stud 171 is an ejecting cam plate 200. Pivoted on the side of plate 200 is a pawl 198. The pawl is in alignment with clutch plate 197 but is normally held out of engagement therewith by a lever 201 abutting against an extending tail on the pawl. The lever is attached to an armature block 203 associated with an ejecting control magnet EM. A compression spring on cam plate 200 presses against the pawl and tends to engage it with the clutch plate. When the magnet EM is energized, lever 201 is rocked in a clockwise direction, releasing pawl 198 and clutching the ejecting cam plate 200 to the driving gear 68.

Ejection is usually initiated by energization of magnet EM on the occurrence of a group change, a total, after a certain number of lines, or at the end of a form. In the present instance, a manual control is provided and the device can be plugged to initiate ejection upon reaching a certain line. In Fig. 5 the ejecting devices are shown in the normal position. There it is noted that a link 210 is articulated at 211 on the side of plate 200, and at the other end it is pivotally connected at 212 to the side of an ejecting frame 213 pivoted at 209 on the frame of the control unit. This rocking eject frame 213 is formed in the shape of an arc and carries a similarly shaped plate with a series of teeth 214 cut in the inner side of the arc. Cooperating with these teeth is a block 215 formed with a single tooth adapted to ratchet over the teeth 214 and engage any one of the teeth, as a link 217 carrying the block 215 is drawn along the inner surface of the arc during line spacing operations. The block 215 is loosely pivoted on link 217 by means of a pivot mounted on the link.

When an ejection clutch connection comprising pawl 198 and clutch plate 197 is made effective by the energization of the magnet EM, the plate 200 is connected to turn in a clockwise direction and moves link 210 and frame 213 to the right with a gradually accelerated motion until the plate 200 has moved through an angle of 90° and then the motion is retarded until the link is practically at rest as the plate reaches a central position after 180° of motion. Then the same type of motion is repeated as the plate goes through the final 180° in arriving back to the home position after a complete revolution.

Continuing now with outlining the connections of link 210 to the platen shaft for the purpose of ejection, it is noted that in its motion to the right the link carries along the ejecting frame 213 by rocking it in a clockwise direction about the pivot 209. As this is done, the teeth 214 on the eject plate 217 engage the block 215 on the end of link 217 and move this link to the right. The right end of link 217 is connected by a stud 246 to a sector 220 loosely pivoted on a shaft 221. The sector teeth are in mesh with a pinion 222 which is clutched to the line spacing shaft 176 which, as noted hereinbefore, serves to rotate the platen shaft 69. A clockwise vibration of sector 220 acts to turn pinion 222 a number of times to advance the record sheet from form to form.

Early in the ejection operation, a pair of contacts 6 is opened to break the circuits which were set up to initiate ejection. These contacts are normally closed by a lever 284 which is articulated with another cam follower lever 279 having one end in a notch 283 in cam plate 200. As soon as ejection is started, lever 279 rides up out of notch 283 and rocks about pivot 280 in a clockwise direction. Because of the pin and slot connection 285, lever 284 is rocked counterclockwise about pivot 511 and contacts 6 are allowed to open with results explained hereinafter in considering the ejection wiring.

*The wiring diagram*

In Figs. 6a to 6l there is shown a rather complete wiring diagram of an alphabetic tabulator including the line selection devices of the present invention. The ordinary control circuits therein and the mechanism controlled thereby are set forth in greater detail in the patents already mentioned and in Patents 2,079,418 and 2,199,547 and application Serial No. 609,854, filed August 9, 1945. Before describing the manner in which the sheet spacing devices are controlled in a novel way, it is believed well to outline a few of the usual tabulator operations.

In such machines the drive of the motor TM (Fig. 6a) is communicated through two clutches called in by magnets CFCM and PCM which are selectively operated for card feeding and printing operations. Closure of switch PS not only calls into operation motor TM, but also activates the main lines 300 and 301. A number of PBC contacts and CF cam contacts operate only when the card feed clutch is engaged. Certain PM contacts operate only when the printer clutch is engaged. Other CB contacts are operated all the time that the motor TM is actuated. A series of TS contacts are operated only when a total cycle is initiated.

Figure 6A:
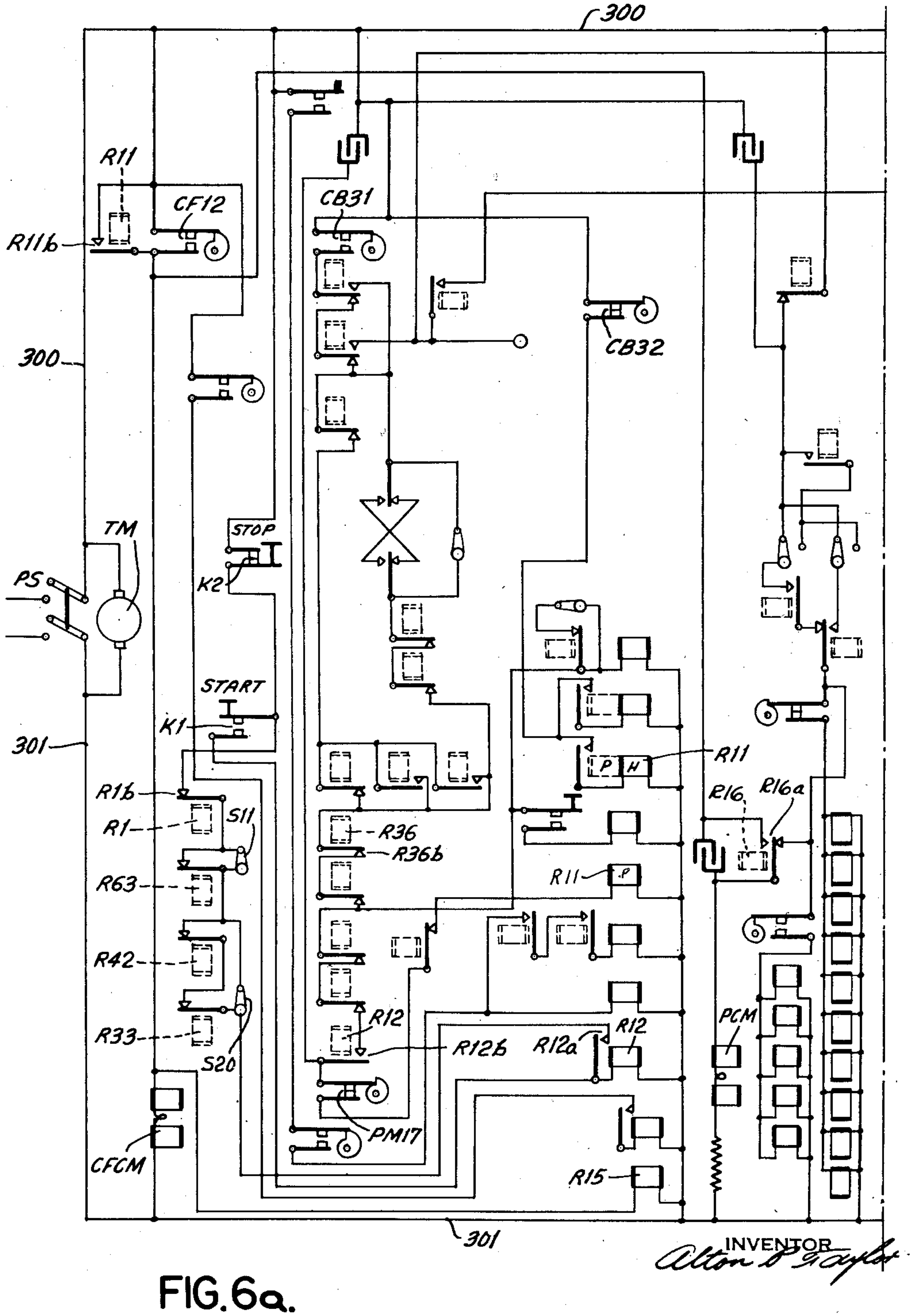

After cards are placed in the magazine, a feeding cycle is initiated by closing the start key contacts K1 (Fig. 6a). Circuits are then established for relays R12 and R11, the latter serving to initiate card feeding by closing contacts R11b in series with the card feed clutch magnet CFCM which serves to call in a picker mechanism for advancing the cards successively.

During the first card feed cycle, a cam contact CF9 closes (Fig. 6g) in series with contacts R6a (closed by the presence of cards in the hopper) and the then effective upper card control brush "0" to call in relays R1 and R2. Contacts R1b (Fig. 6a) are then operated to stop the card feed after one starting cycle. A second depression of the start key causes a succession of card feed cycles because once a card is advanced far enough to insulate the upper "0" brush (Fig. 6g), cam contacts CF9 cannot energize relay R1 as long as cards continue to advance.

Near the end of the last cycle when the last card is past the upper sensing station UB, cam contacts CF9 close and energize relay R1 to open contacts R1b to deenergize relay R12 and stop the card feed mechanism. The lower card lever relays R3 and R4 (Fig. 6g) are energized when the first card closes contacts LCLC as it passes beyond the station UB, and they remain energized until the last card passes the lower sensing station LB.

In a listing operation the card passes the sensing station LB in synchronism with the upward movement of the type bars. Magnets PR (Figs. 3 and 6g) operate the stop pawls to locate the type bars in positions corresponding to the data punched in the card and at a predetermined time the hammers are tripped to record the information on the record sheet. Therefore, listing operation requires energization of the card feed clutch magnet CFCM (Fig. 6a) to advance the cards, and energization of the printer clutch magnet PCM for raising the type bars. A relay R15 is connected to clutch magnet CFCM to establish printer operating connections while cards are feeding. The printer clutch magnet PCM is called into operation under control of relays R15 and R16 (Fig. 6b) when switch S1 is set for listing operation.

Adjustment of the type bars is regulated by impulses carried to the print control magnets PR from the lower sensing brushes LB in contact with a card C. A numeral printing control circuit involves line 300 (Fig. 6g), contact breakers CB1–4, timer contacts CF17 and CF18, lower card lever relay contacts R4a, common contact brush 302, contact roller 303, a brush LB extending through a perforation in the card, plug socket 304, a plug wire to socket N1 of a numeral bank, normally closed total contact TSa, magnet PR and line 301.

Alphabet printing is carried on in a similar way with the exception of preparation for zoning the longer type head. A typical adding entry circuit is as follows: line 300 (Fig. 6g), cam contacts CB1–4, cam contacts CF17—18, contacts R4a, the common brush, the contact roller 303, a brush LB extending through a perforation in the card, plug socket 304, a plug wire to plug socket 305 (Fig. 6h), the left side of contacts R177b closed for adding, contacts PBC1, total switch contacts TSb, magnet AM and line 301. Magnet AM then operates to clutch adding gears at a time commensurate with the value of the sensed perforation. After the proper digit is added the gears are mechanically disengaged.

Group control devices are provided for separately considering different classes or groups of cards as distinguished by different group number perforations for different groups. Consecutive cards are compared, one card being read at station UB while the preceding card is read at station LB. As long as the card readings are alike, the card feed continues to function. When it is sensed that the two group number readings are not alike, the feed stops, a total is printed, the accumulator is zeroized, the record sheet form is spaced or ejected to bring in a new form, and the machine either stops or automatically starts feeding the cards of the next group.

The comparing circuits are connected by plug wiring between pickup coils of selected sensing banks of the upper and lower stations UB, LB devoted to sensing group number perforations. An example of the comparing circuits is as follows: line 300 (Fig. 6g), cam contacts CB1–CB4, timer contacts CF17 and CF18, upper card lever relay contacts R2a, the common brush contacting roller 306, a brush UB extending through a code or group number perforation, plug socket 307, a plug wire to socket GC1 (Fig. 6f), pickup coil R129, contacts R169b closed for comparing and wire 309 to line 301. As long as group numbers agree, a companion circuit to that already traced is set up at the same time through a pickup coil of relay R130 as energized through a related sensing bank in station LB by the following circuit: line 300 (Fig. 6g), cam contacts CB1–CB4, contacts CF17 and CF18, relay contacts R4a, the common brush on roller 303, a brush LB extending through a group number perforation plug socket 304, a plug wire connected to socket GC2 (Fig. 6f), relay coil R130, contacts R172a, and line 301. Relays R129 and R130 have holding coils and contacts in series therewith for sustaining the comparing circuit connections.

Figure 6B:
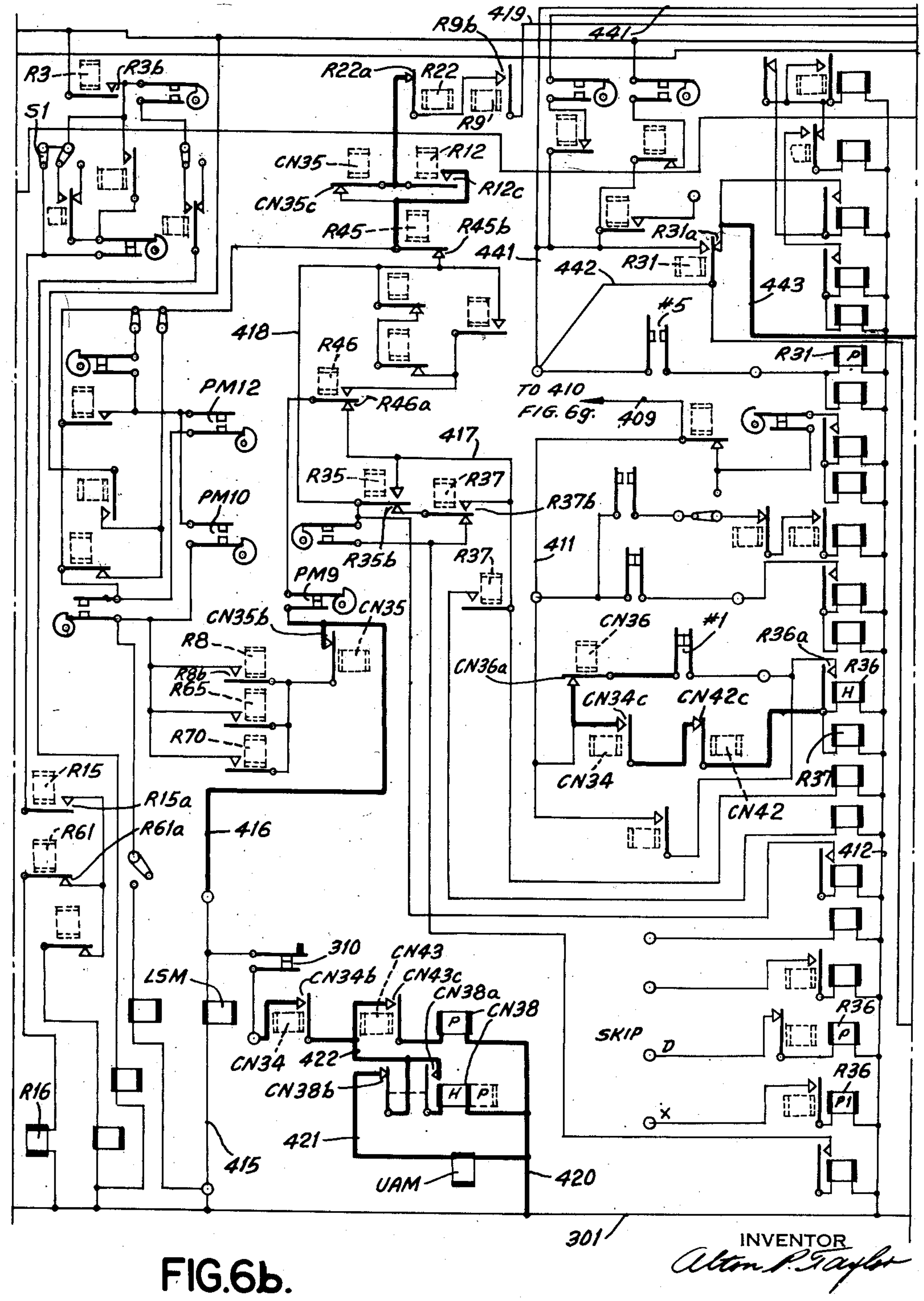
Figure 6C:
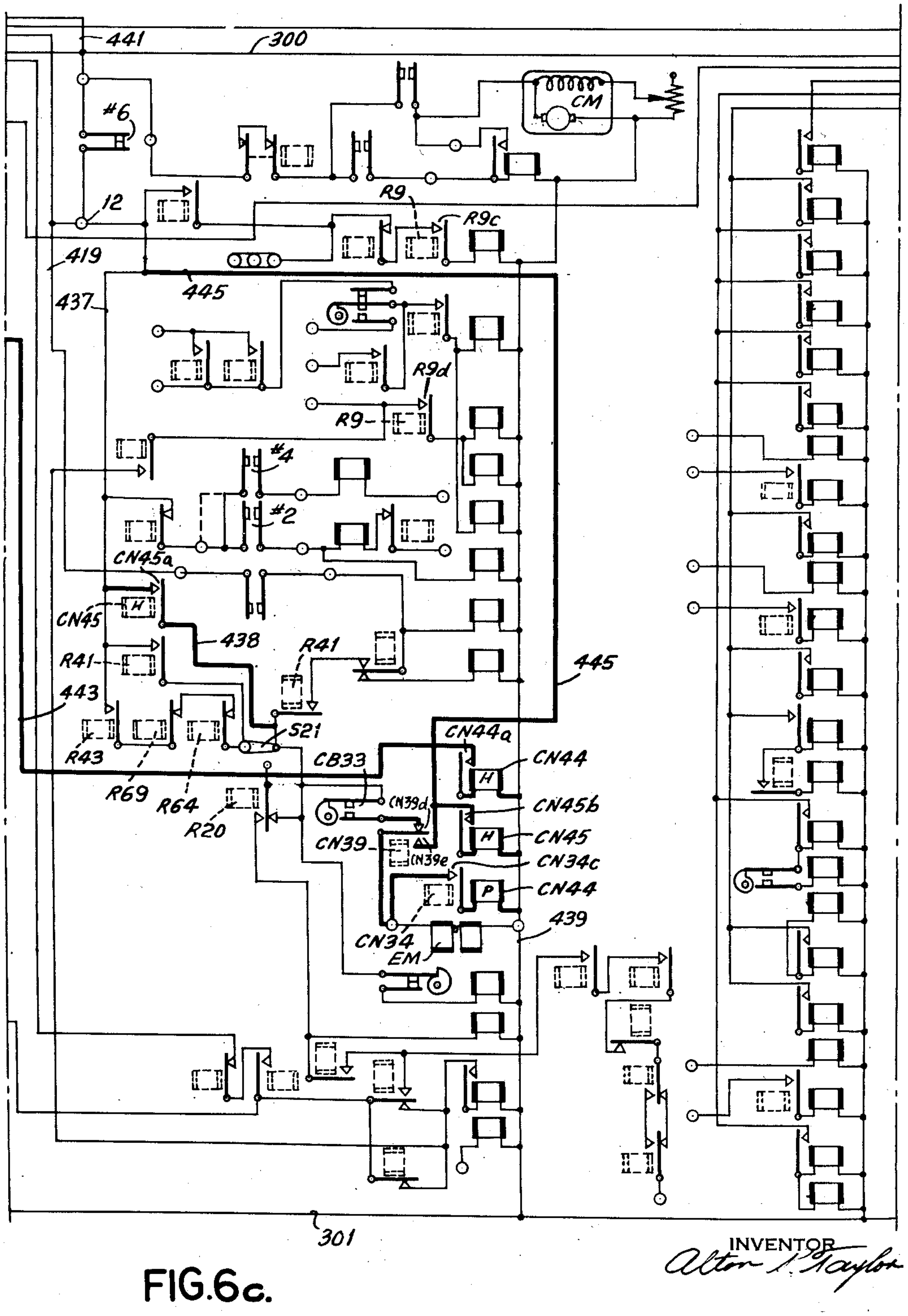
Figure 6D:
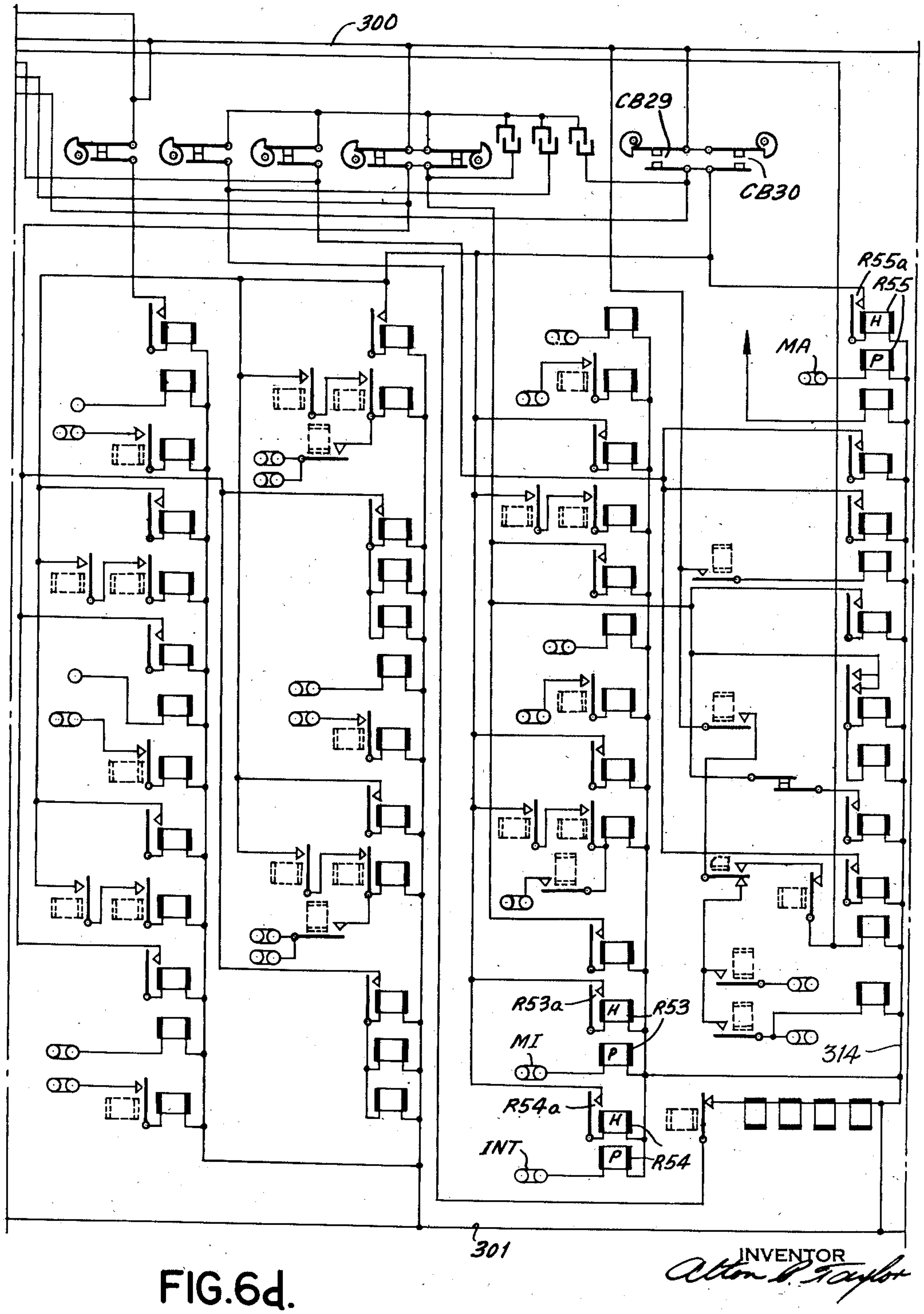
Figure 6E:
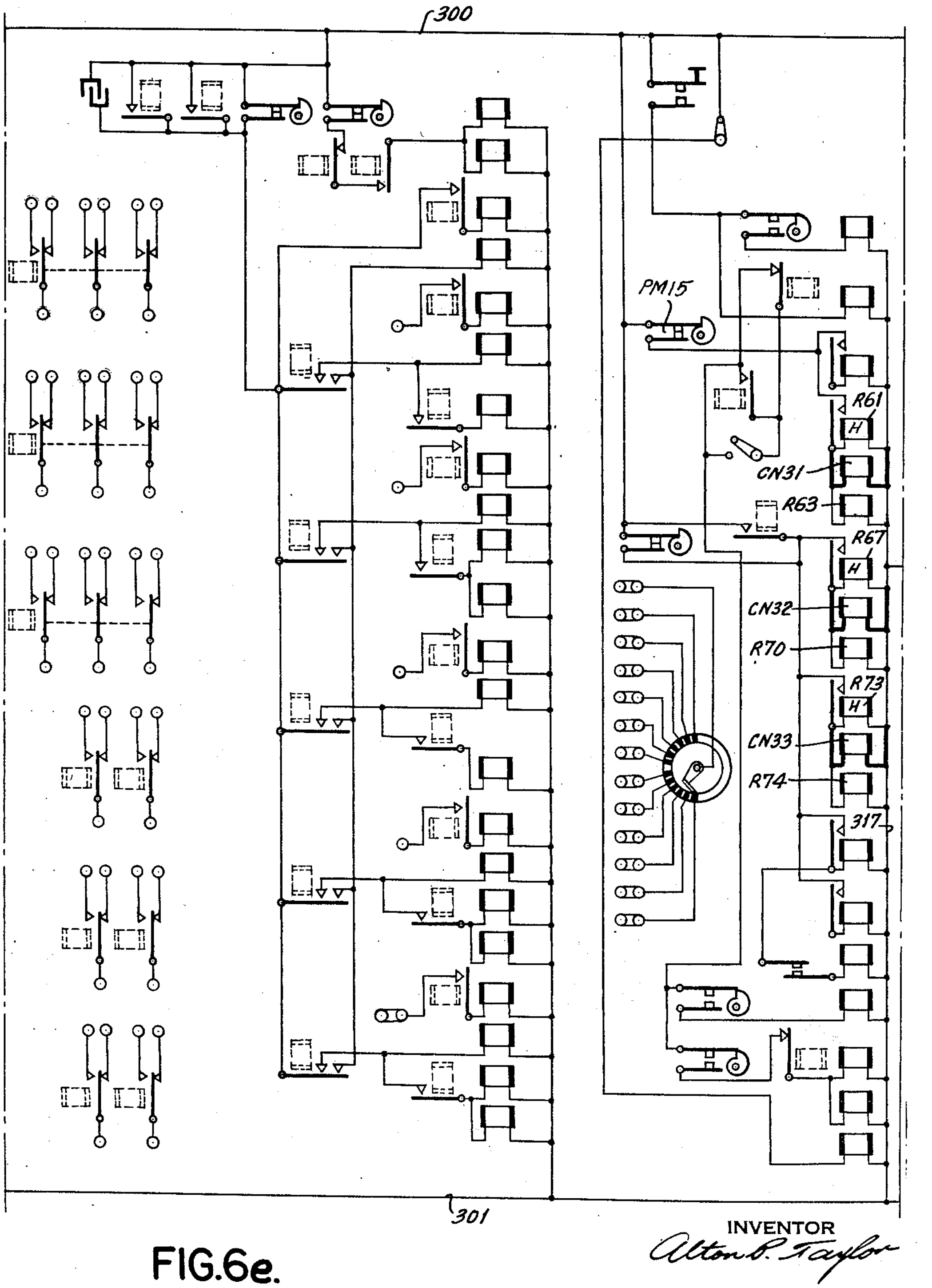
Figure 6F:
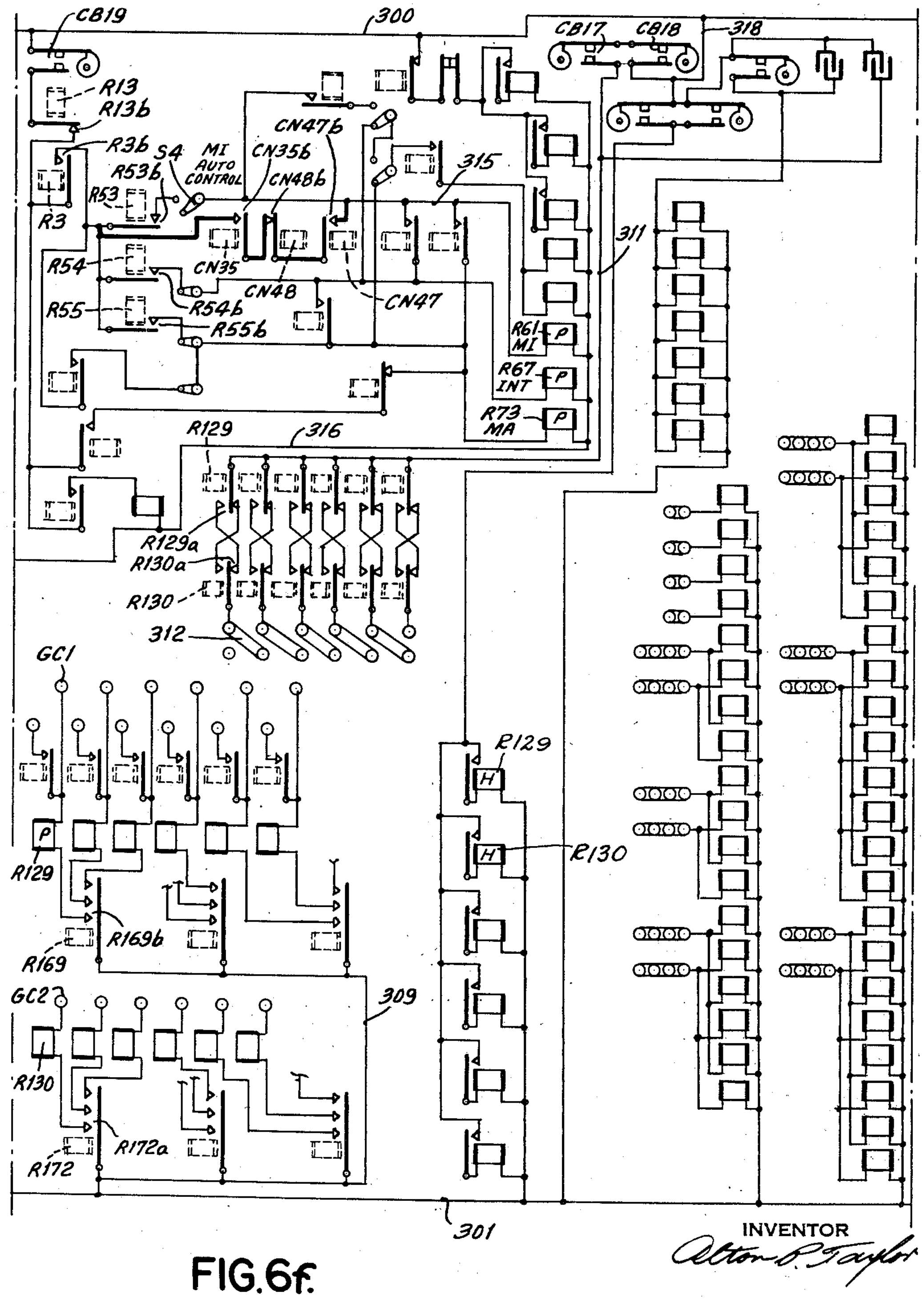

Referring to the middle of Fig. 6f, it is seen that the related pairs of comparing relays are associated with pairs of contacts so arranged that, when the related pair such as relays R129 and R130 are energized at the same time, they prevent the erection of a circuit path. However, should one or the other be energized alone, showing that there is a disagreement in the group control perforations, then a circuit is established for initiating group control operation. Upon disagreement a circuit, such as the following, is closed: line 300 (Fig. 6*f*), wire 318, cam contacts CB17, CB18, wire 311, the left contacts R129*a*, the right contacts R130*a*, plug socket 312, a plug wire to socket MI (Fig. 6*d*), the pickup coil of relay R53, wire 314 and line 301. The holding coil of relay R53 operates contacts R53*b* (Fig. 6*f*) in series with a minor control pickup coil of a relay R61. The minor control circuit includes line 300, cam contacts CB19, normally closed contacts R13*b*, lower card lever relay contacts R3*b*, relay contacts R53*b*, switch S4, wire 315, the pickup coil of relay R61, wires 316 and 317, and line 301. The holding coil of relay R61 (Fig. 6*e*) and associated coil R63 have a number of minor control contacts throughout the machine for controlling the suspension of card feeding and the initiation of total taking and printing in the usual way. A special minor control coil CN31 is seen to be associated with coils R61 and R63 for special minor control in connection with the line selection devices.

In the foregoing sections, the group change controls are described as connected for minor control. It will be realized that along with such control plugging may be used to call in other intermediate and major control devices under control of other group number columns of perforations in the cards. The plugging from a socket such as group change socket 312 (Fig. 6*f*) may be made to either INT or MA (Fig. 6*d*) to call into operation relays R54 and R55. The holding coils for these relays (Fig. 6*f*) call into operation the intermediate pickup coil R67 and the major pickup coil R73. Reference to the right side of Fig. 6*e* reveals that the intermediate and major holding coils have companion relays. Along with relay R67 is a relay R70 and a special line selection control relay CN32. With major relay R73 is an associated coil R74 and a special control relay CN33.

The foregoing description of the wiring connections relates in the main to ordinary tabulator controls while the following sections are concerned with the improvement in line selection control. Figs 6*i*, 6*j*, 6*k* and 6*l* are entirely novel and throughout the other wiring views the novel controls are shown in heavy lines.

Preliminary to the use of the machine for line selection control, switch LSS (Fig. 6*l*) is closed and a relay CN34 is called into operation. This relay CN34 closes a pair of contacts CN34*a* shown at the bottom of Fig. 6*k* for connecting the main wire 308 of the line selection device to the main line 301. When the wire 308 is connected to the line 301, another conditioning relay CN35 is called into operation and it closes associated contacts CN35*a* calling a third relay CN36. The circuit through both relays is as follows: line 300 (Fig. 6*k*), wire 313, relay CN35, wire 308, contacts CN34*a*, and line 301. A parallel circuit includes closed contacts CN35*a*, relay CN36, wire 328, and line 301.

These three relays CN34, CN35 and CN36 operate preliminary conditioning connections throughout the line selection controls. When they are deenergized, the machine is conditioned for ordinary operation.

Each run of cards is preceded by a blank card which is used in connection with the starting operations to condition the machine for printing and line selecting operations. In addition to the use of a blank card, the machine is provided with a number of special starting control relays for preventing automatic line spacing or skipping operations until the first data card is in position to pass the lower brushes and cause printing. The line spacing controls are arranged to cause spacing unless stopped and the relays about to be discussed cause such stoppage until the machine is ready for printing.

In connection with the entry of the first card, i. e. the blank card into the machine, the special relay CN47 (Fig. 6*g*) is picked up along with the ordinary "first card" relay R9. The circuit for this preliminary sensing cycle is as follows: line 300, contacts CB1–4, wires 319, 320, lower card lever relay contacts R4*b*, cam contacts CF22, wire 321, the pickup coil of relay R9 and wire 322 to line 301. Relay R9 then closes contacts R9*a* to set up a holding circuit for coils R9 and CN47 as follows: line 300, wires 323, 324, card lever relay contacts R4*c*, wire 325, contacts R9*a*, coils R9 and CN47, and wire 322 to line 301. This relay CN47 has contacts CN47*b* (Fig. 6*f*) in series with minor control pickup relay R61, for forcing a minor control clearing cycle on the feeding in operation. Also in series with contacts CN47*b* are contacts CN35*b* and CN48*b*, the former for calling in the use of the automatic clearing cycle when line selection control is to be used, and the latter for dropping out such control after the regular cards appear under the lower contact lever to prevent further use of the automatic clearing operation. It is noted that contacts CN35*b*, CN48*b* and CN47*b* provide a shunt circuit around the ordinary minor control initiating contacts R53*b* described hereinbefore for calling in relay R61.

Later on, in the same cycle when the blank card is presented, the minor relay contacts R61*b* (Fig. 6*g*) are effective to call in another special relay CN48. This is the relay which controls the points or contacts CN48*b* (Fig. 6*f*) already mentioned as in series with the minor control relay R61 for preventing repetition of the automatic clearing operation. The complete circuit for the pickup coil of relay CN48 is as follows: line 300 (Fig. 6*g*), cam contacts CB1–4, wire 326, cam contacts CB22 and CB23, relay contacts R61*b*, wire 327, pickup coil CN48 and wire 322 to line 301. Relay CN48 closes contacts CN48*a* in series with its holding coil. The holding coil of relay CN48 is shown as being in series with the lower card lever relay contacts R4*c* and parallel with relay CN47 over a circuit already traced, and the circuit therethrough is held as long as cards appear under the lower brushes and thereby prevent further automatic forced clearing cycles.

Figure 6G:
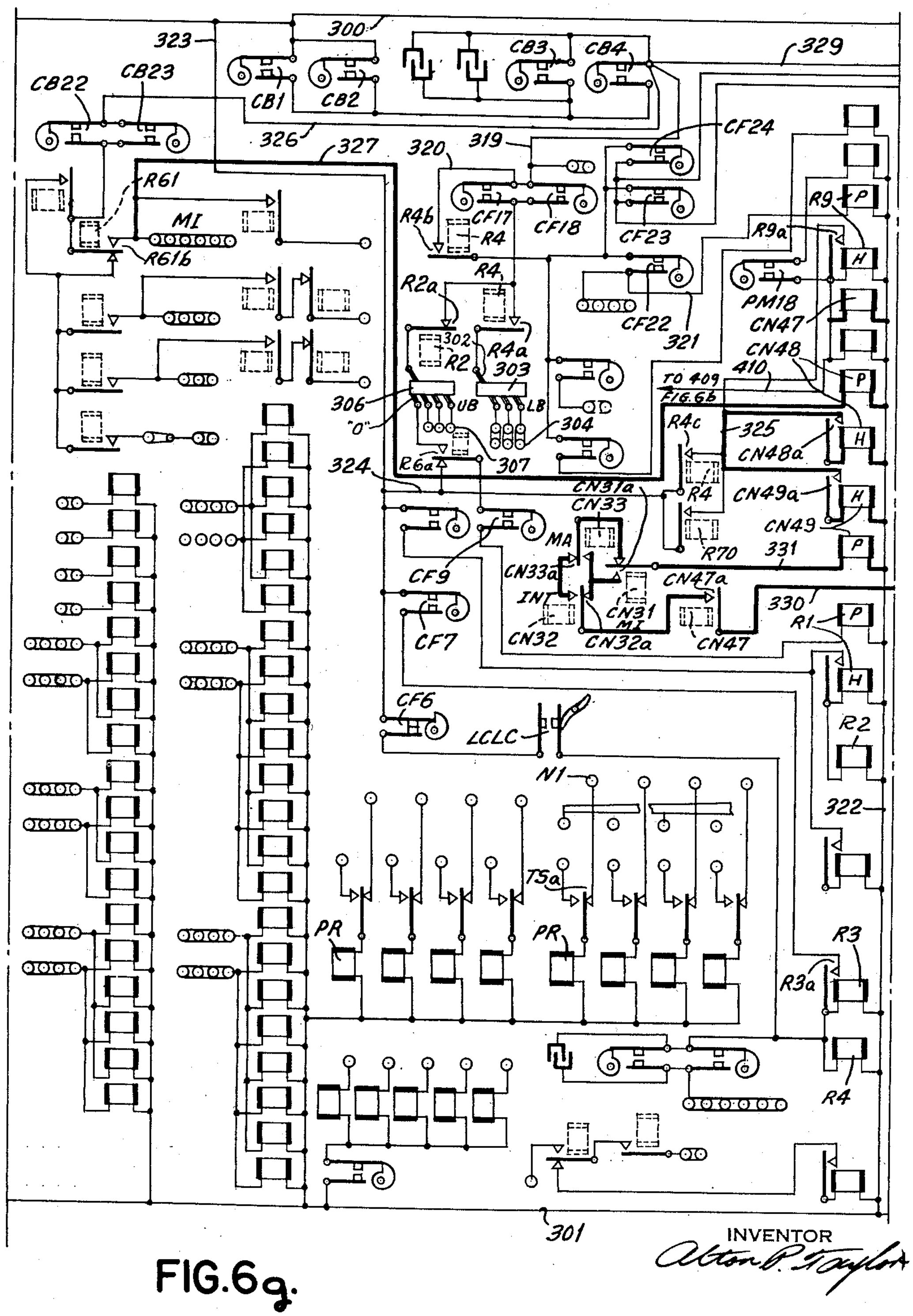
Figure 6H:
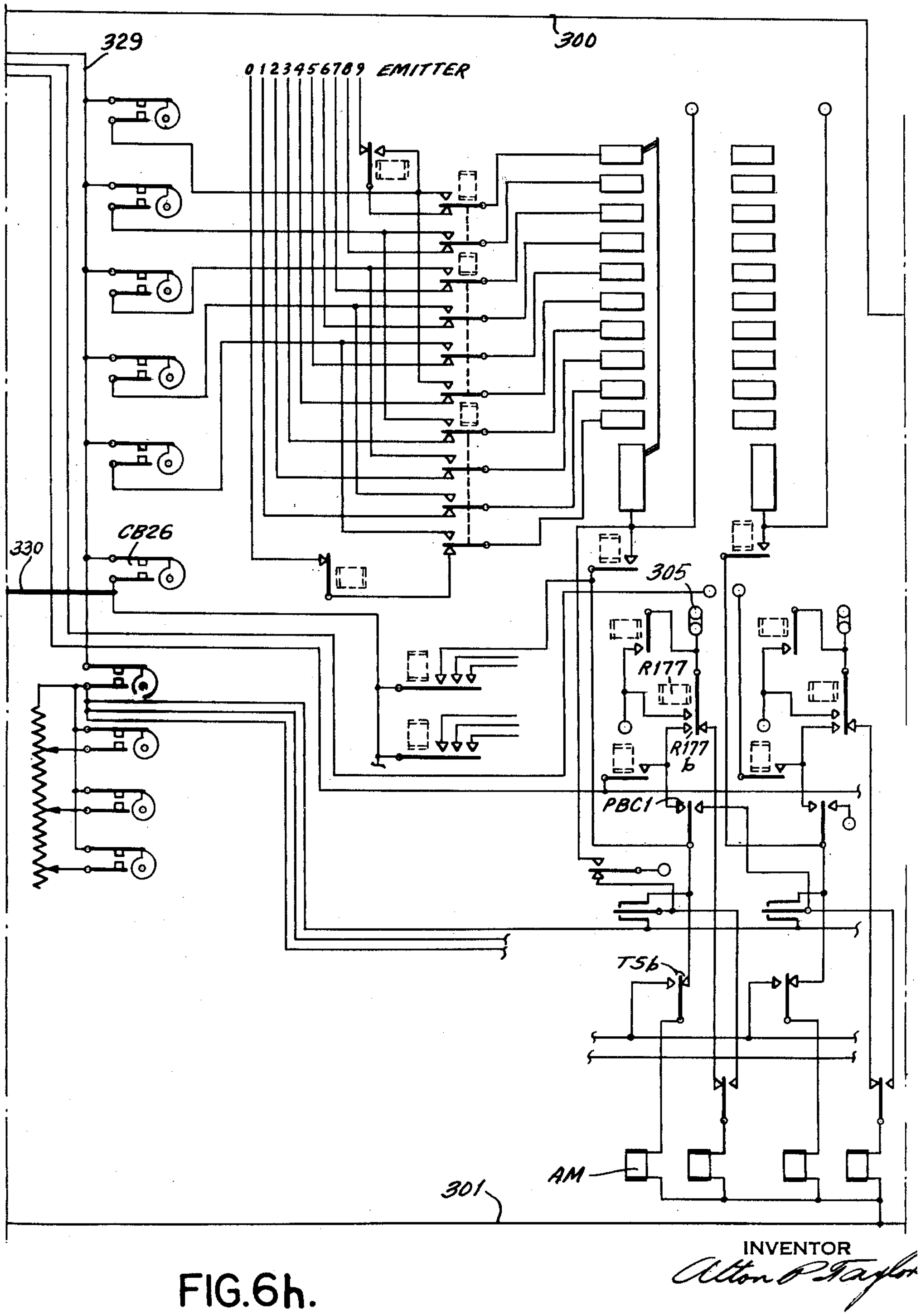

Another special relay CN49 is provided in connection with the starting controls to prevent spacing until the machine is ready for recording. The pickup coil of this relay CN49 is in series with a number of major, intermediate and minor group control relay contacts CN31*a*, CN32*a*, CN33*a* operated in succession upon the preliminary entering operations customary in a machine of the kind having plural group control divisions. In Fig. 6*g* it is seen that along with the series of group control contacts connected to the pickup coil of relay CN49, there is also a pair of contacts CN47*a* related to relay CN47 for calling in the preliminary control only as an incident to the consideration of the first card. The group control relay contacts associated with the pickup coil of relay CN49 are so arranged that during the succession of clearing cycles involving the major, intermediate and minor controls exercised in succession, the first two operations, i. e. major and intermediate, fail to provide a through circuit to the pickup coil. The three relays CN33, CN32, and CN31 are picked up together and deenergized successively in the order given. Since relay CN33 is the first to be deenergized there is then no circuit to relay CN49. It is only late in the second group control cycle when relay CN32 is deenergized along with relay CN33 that a circuit is established. Before the third clearing cycle with the minor contact shifted alone, a circuit is established thereto as follows: line 300 (Fig. 6*g*), cam contacts CB1–4, wire 329 (Fig. 6*h*), cam contacts CB26, wire 330 (Fig. 6*g*), relay contacts CN47*a*, relay contacts CN32*a*, CN31*a*, wire 331, pickup coil CN49, wire 322 and line 301.

When relay CN49 is energized, the holding coil contacts CN49*a* in series with the holding coil are closed in series with the lower card lever relay contacts R4*c*, and this relay is held along with relay CN48 over the circuit already described.

Relay CN49 has a pair of normally closed contacts CN49*b* (Fig. 6*k*) in series with the holding coil of a line space stopping control relay CN42, the operation of which is described hereinafter. It is sufficient to note here that during the preliminary operations, these contacts CN49*b* of relays CN49 are closed to energize relay CN42 and open contacts CN42*c* (Fig. 6*b*) in series with the spacing start relay R36 and effective to prevent line spacing until all the preliminary clearing operations are performed. Then they open to put the line stopping control under the influence of the recording control contacts PM—C2 (Fig. 6*k*), so that a printing operation must take place before the line spacing controls are permitted to seek out the line selected for the following recording operation.

Before going further into the special interlocks associated with the line selection controls, it is believed well to consider first the manner in which code number contacts are set up under control of the card sensing devices and also the manner in which predetermined line selection contacts are reached and closed by means of stepping relays operated in synchronism with the line spacing devices.

Consider first the sensing of code or group numbers in the cards as they pass under the upper brushes and thereby set up relays, which are held over to provide circuit connections while the same card passes under the lower brushes for recording control.

Figure 6I:
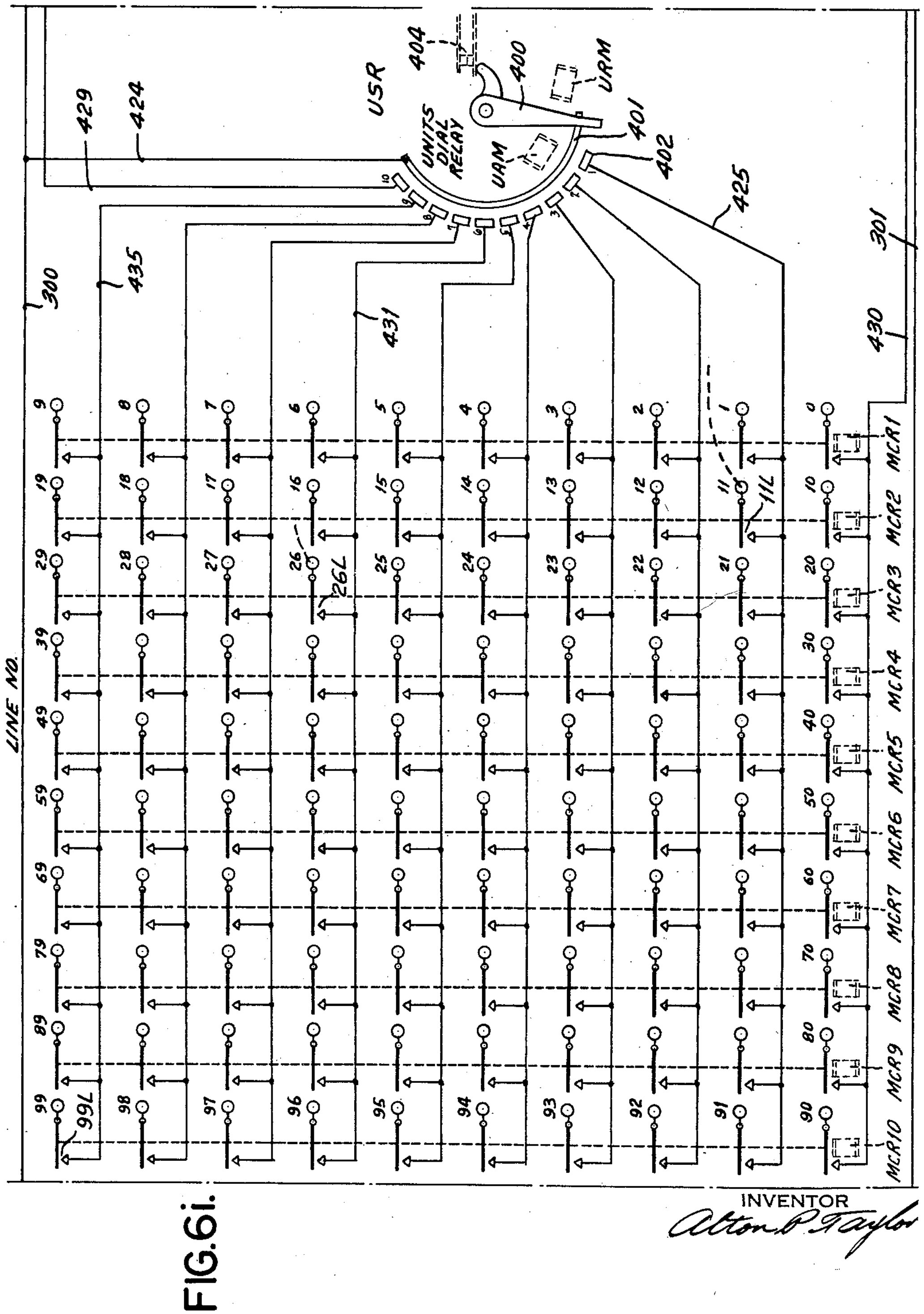
Figure 6J:
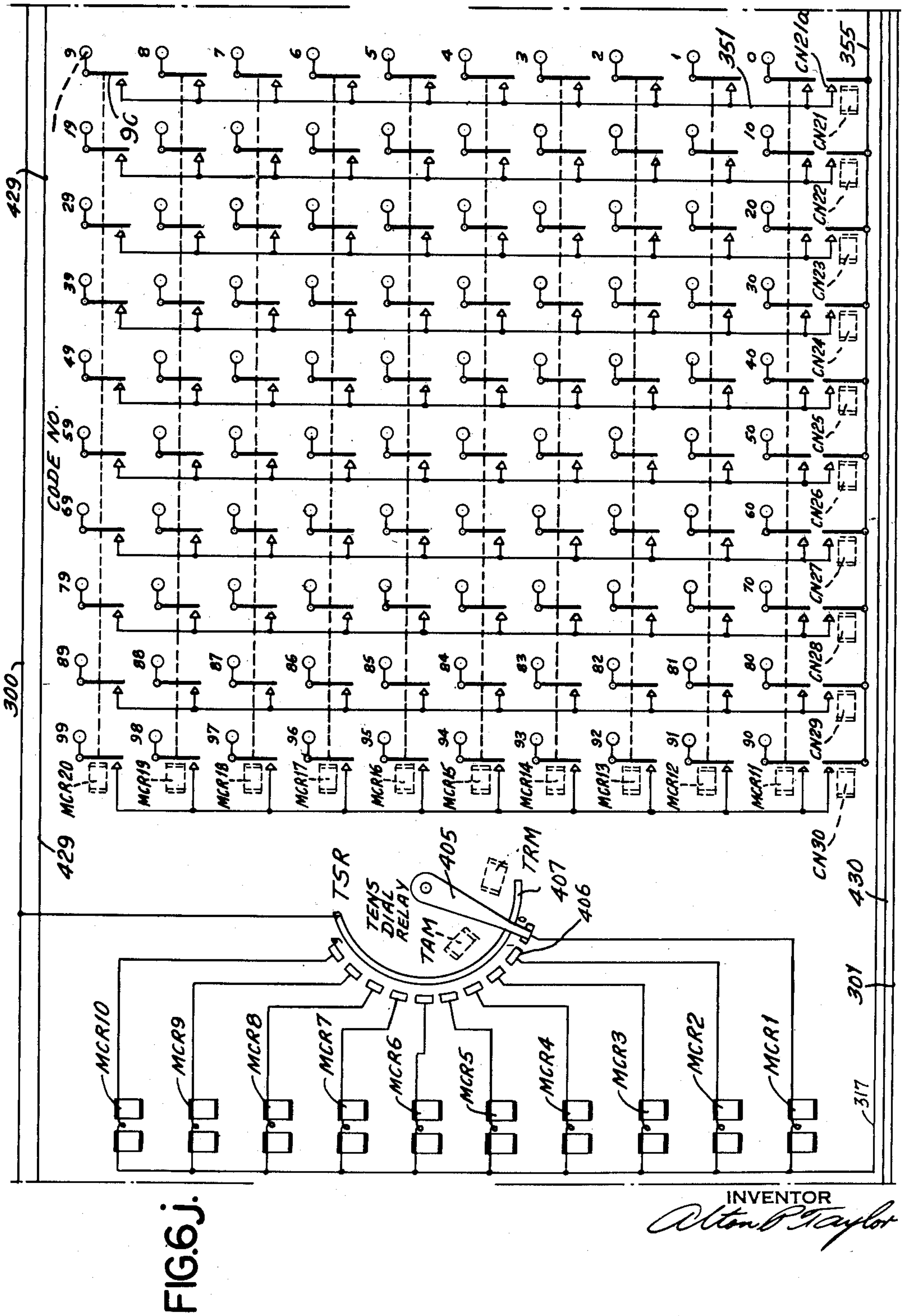
Figure 6K:
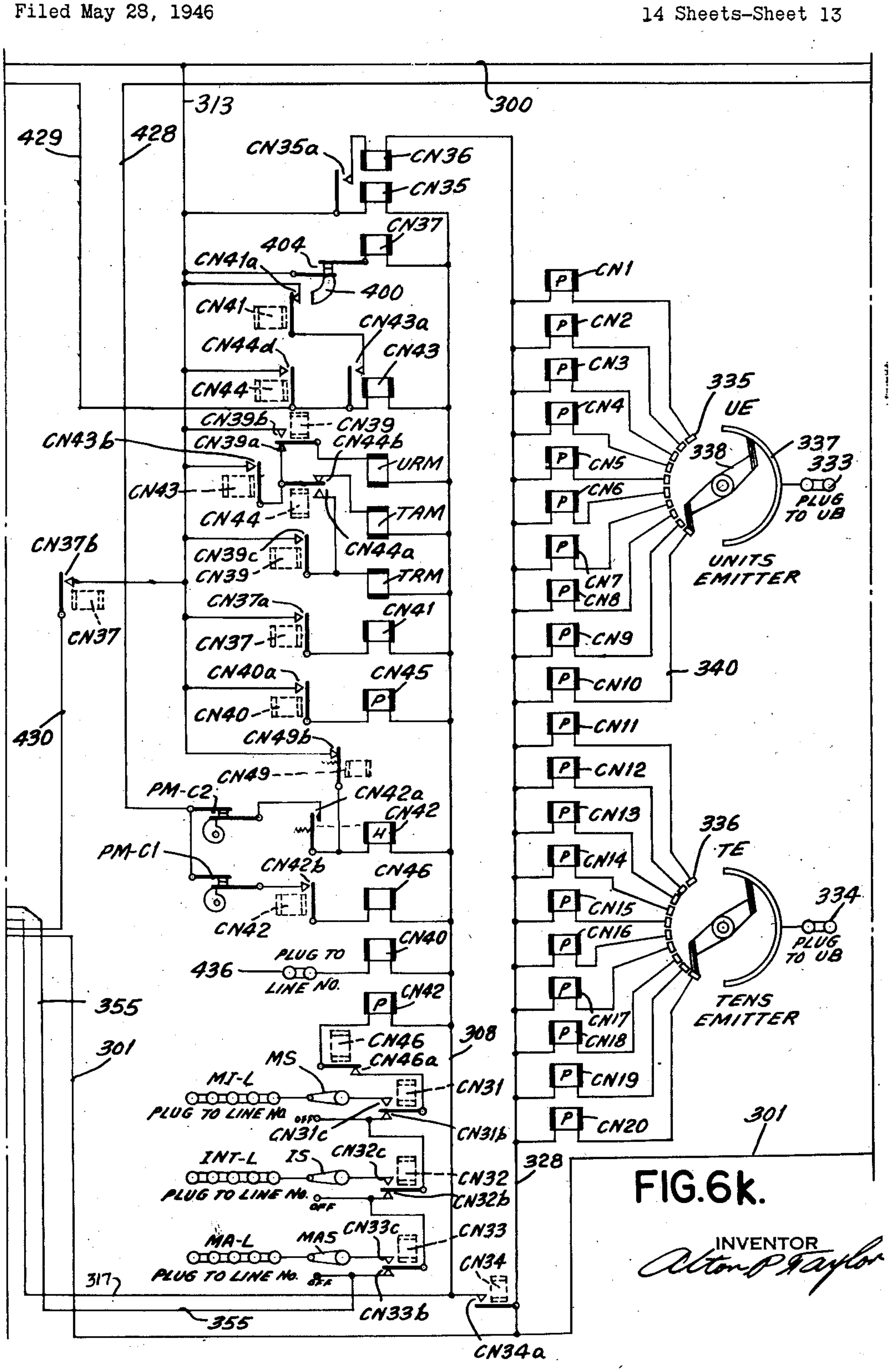

Referring to Fig. 6*k*, it is seen that a pair of units and tens emitters UE and TE are connected so that the common contact sectors have plug sockets 333 and 334 suited for plugging to the units and tens orders plug sockets 307, Fig. 6*g*, where the code numbers are to be sensed under the upper brushes UB. The ten contact segments 335 (Fig. 6*k*) of the units emitter UE are connected separately to the pickup coils of relays CN1 to CN10. In a similar manner the contact segments 336 of the tens emitter TE are connected separately to the pickup coils and relays CN11 to CN20. A sample circuit may be traced, assuming that the code number 10 appears in a record card. The path of the impulse is as follows: line 300 (Fig. 6*g*), cam contacts CB1–4, wire 319, cam contacts CF17 and CF18, card lever contacts R2*a*, common brush on contact roller 306, an upper brush UB extending through a code number perforation in the card, plug socket 307 and a plug wire to plug socket 333, Fig. 6*k*, common contact sector 337, contact brush holder 338 connected to the card feed shaft and rotated in synchronism therewith, segment 335 of the tenth position, wire 340, the pickup coil of relay CN10, wire 326 and line 301.

The holding coils for the code number relays CN1 to CN20 are shown in Fig. 6*l*. The energization of the units code number relays CN1 to CN10 is held over most of the first cycle during the closure of card feed cam contacts CF—C1, and the energization of the tens group of relays CN11 to CN20 is held by the closure of the same cam contacts. The holding coils operate contacts for calling in multicontact relays MCR11–20 and other single contact relays CN21–30 for closing any of a plurality of 100 pluggable code number contacts shown in Fig. 6*j*. Relays for operating the contacts are shown at the right of Fig. 6*l*. There it is seen that the multicontact relays MCR11–20 are called in separately by associated pickup relays CN1 to CN10. These multicontact relays are therefore picked up by the units emitter relays and, as shown in Fig. 6*j*, they are related to ten separate horizontal lines of ten pluggable code number contacts arranged so that the horizontal lines relate to different units digits while the vertical lines relate to different tens denominational orders.

In considering the code number 9, the tens denomination representation will be "0" and therefore the pickup coil CN11 (Fig. 6*k*) of the tens emitter TE will be picked up along with the units coil CN10 by a circuit similar to the one last traced. Relay CN10 closes contact CN10*a* (Fig. 6*l*) and the holding coil is called in by the circuit: line 300, cam contacts CF—C1, wire 341, contacts CN10*a*, holding coil CN10, wire 342 and line 301. Relay CN10 also closes contacts CN10*b* to call the multicontact relay MCR20 into action by the circuit through line 300, cam contacts PM—C3 closed at the mid-point of a recording cycle, wire 343, relay contacts CN10*b*, relay MCR20, wire 344 and line 301. Relay MCR20 not only closes the top horizontal line of ten contacts, Fig. 6*j*, but it also closes contacts MCR20*a* (Fig. 6*l*) for holding circuit including line 300, cam contacts CB—C1, wire 345, contacts MCR20*a*, relay MCR20, wire 344 and line 301. Parallel contacts R11*g* aid in holding the relay until line spacing is completed as explained later.

The other factor to be considered in connection with the code number 09 is the effect of the relay CN11 which closes contacts CN11*a* to call in its holding coil by the circuit line 300, cam contacts CF—C1, wire 346, contacts CN11*a*, holding coil CN11, wire 347 and line 301. Relay CN11 also closes contacts CN11*b* to call in the pickup coil of relay CN21 by the connections including line 300, cam contacts PM—C3, wire 349, relay contacts CN11*b*, pickup coil CN21, wire 350 and line 301. Relay CN21 not only closes contacts CN21*a* (Fig. 6*j*) to energize wire 351 on which are strung the zero of tens denomination contacts, but it also closes contacts CN21*b* (Fig. 6*l*) to hold relay CN21 during line spacing and recording. The holding circuit is from line 300, through cam contacts CB—C1, wire 352, contacts CN21*b*, holding coil CN21, wire 353 and line 301.

From the foregoing, it will be apparent that although relay MCR20 (Fig. 6*j*) closes all of the top row of contacts, contact "9" will be the only effective one because it is on the live wire 351 which, through contacts CN21*a*, connects to wire 355 leading to the line space stopping control relay CN42 as explained fully hereinafter.

Returning to the manner of selection of the multi-contact relays, it is noted at the right of Fig. 6l that they are in series with the pair of contacts CB—C1 and R11g arranged in parallel, so that one or the other remains closed to sustain the code number setting. The contacts usually used are the constantly running contacts CB—C1 which open after the printing operation in each cycle to deenergize the relays in readiness for a new code number setup. However, should there be the selection of a line calling for a plurality of spacing operations, the code number relay setting is preserved by the continued closure of relay contacts R11g controlled by the automatic start relay R11, Fig. 6a, which is in turn controlled by relay R36, Fig. 6b, for detecting when the carriage operation is fully performed. Relay R36 is deenergized by the opening of contacts CN42c by the space stopping relay CN42 as noted hereinafter. Thus, relays NCR11-20 are sustained as long as required by the spacing operations.

There is similar control over the other set of code number relays CN21-CN30 (Fig. 6l) called in by the associated set of tens code number pickup relays CN11 to CN20. The pickup coils for these relays CN21 to CN30 are already mentioned as being in series with the cam contacts PM—C3, and the holding coils for them are connected by wire 352 with the parallel contacts CB—C1 and R11g already mentioned as providing for holding the energization of the code number relays as long as the line spacing conditions warrant.

Looking along the bottom of Fig. 6j, it is noted that the tens code number relays CN21 to CN30 are each associated with a vertical line such as line 351 common to the vertical denominational row of contacts effective to close associated contacts to put one column of contacts in the space stopping circuit which is pluggable from any one of the one hundred code number positions, and to any one of the one hundred line selection contact positions shown in Fig. 6i and about to be described.

The line number plug sockets and contacts are shown in Fig. 6i arranged in horizontal rows according to the units digits and in vertical columns according to the tens denomination. Each horizontal row of contacts is connected to a common line and the nine lines are connected separately to the segments 402 of a units stepping relay USR having a common contact sector 401. The movable contact arm 400 of the stepping relay is shown in the 0 or normal home position, wherein it is restored after each sequence of ten steps, or after restoration incidental to the end of line selecting operations, or upon key selection of restoration. In this home position the lever 400 operates to close contacts 404 which are mentioned hereinafter in connection with interlocking controls for suspending recording and spacing operation, while stepping relay restoration takes place. Movement of contact arm 400 is controlled in synchronism with operation of the line spacing mechanism by means of advancing and restoring magnets UAM and URM described hereinafter.

Along the bottom of Fig. 6i it is noted that a series of ten multicontact relays MCR1 to MCR10 control the selection of the vertical columns, that is, the tens denomination sets of line selection contacts. These relays MCR1 to MCR10 are connected separately to the contact segments 406 (Fig. 6j) of a tens stepping relay TSR having a common contact sector 407 and a moving contact arm 405, which is operated by an advancing magnet TAM energized through the units stepping relay after each cycle of ten steps. Arm 405 of the tens relay is restored by a release magnet TRM upon operation of a release key or upon completion of the spacing of a form or sheet as terminated by the use of an ejection operation for ejecting a sheet or moving a continuous strip from form to form.

Assuming that the cards are so arranged that the first group number or code number is the digit 9, and that the data associated therewith is to be recorded on line 11 and also assuming that the preliminary starting conditions are completed and that the data card is about to pass the lower sensing brushes, then the line spacing controls will be in effect and the record sheet SH will be advanced by operation of the line space magnet LSM as energized by circuits about to be traced. The usual initiation of line spacing is carried out by relays R36 and R37 (Fig. 6b), through carriage contacts #1 now ineffective because contacts CN36a are opened by the line selection switch relay CN36. However, relay R37 is made effective otherwise through the closed line selection switch contacts CN34c and closed line space stopping relay contacts CN42c by the circuit including line 300 (Fig. 6g), wire 323, 324, lower card lever relay contacts R4c, wire 325, "first card in" relay contacts R9a, wire 410 to wire 409 (Fig. 6b), wire 411, contacts CN34c and CN42c, relay R37, wire 412 and line 301. Relay R37 then closes contacts R37b for completing the line space operation circuit which may be traced on Fig. 6b from line 301 through wire 415, magnet LSM, wire 416, cam contacts PM9, closed overflow relay contacts R46a, wire 417, upper contacts R37b now closed, lower contacts R35b of the other carriage skip relay R35, wire 418, eject interlock relay contacts R45b, start interlock relay contacts R12c, ejection control relay contacts R22a, "first card in" relay contacts R9b, wire 419 (Fig. 6c), post 12, carriage contact #6 (opened when ejecting as noted in Fig. 5) and line 300. Magnet LSM when so energized operates for line spacing as described in connection with Fig. 4. Line spacing or skipping will continue until relay R37 is deenergized by the opening of contacts CN42c as relay CN42 is made active upon reaching a predetermined line.

The other relay R36 which is also called in on line spacing operations is the one ordinarily used in the automatic carriage for interlock control. Its contacts R36b (Fig. 6a) are seen to be in series with the card feed control relay R11, the contacts relay R11b of which open to suspend operation of the card feed clutch magnet CFCM during skipping.

For normal operation, contacts CN35c remain closed to provide ordinary line spacing circuit connections. However, when line selection operation is chosen, relay CN35 is activated and contacts CN35c are opened to make the line spacing circuit dependent on the start key interlock contacts R12c in parallel therewith. Relay R12 (Fig. 6a) is sustained in energized condition by a circuit through the stop key contacts K2 and upper card lever relay contacts R1b open during starting until a card appears under the upper brushes.

Other contacts CN35b of line selection relay CN35 are associated with the line spacing circuit. They serve, when opened, to break the line space circuit connections usually made through relay contacts R8b to cause final total space and extra total space during ordinary tabulator operations.

Since the line spacing circuit is a sustained circuit, it is necessary to provide other means for registering an impulse upon each line spacing operation, and that is done through the operation of special contacts 310 (Fig. 4) by vibration of the lever 175 which opens and closes 310 upon each line spacing operation. Upon each closure of contact 310 (Fig. 6b), an impulse is directed through the magnet UAM which is the operating magnet for the units stepping relay USR. The stepping circuit is as follows: line 301, wire 420, stepping magnet UAM, wire 421, normally closed interlock contacts CN38b which are opened to prevent impulsing while the stepping relay is restoring, wire 422, switch relay contacts CN34b closed for line selection control, impulsing contacts 310, wire 416, and the remainder of the circuit is common to the line space control circuit already traced. Since contacts 310 are closed for each line space actuation of magnet LSM, it is evident that the units stepping relay USR (Fig. 6i) will be advanced in synchronism therewith, one step for each line space movement.

Of course, preliminary to the operation involving the recording of data on line 11, there is inserted a plug wire from code number socket 9 (Fig. 6j) over to line number socket 11 (Fig. 6i), and the line spacing operations are permitted to continue until a through circuit is provided by the movements of the units and tens stepping relays, after eleven spacing operations have been performed. Then a circuit is completed and line spacing is terminated by the energization of the line space stopping relay CN42. In Fig. 6b it is noted that this relay CN42 has contacts CN42c in series with relay R37 which is the initiating and holding relay for energization of the line space magnet LSM. The circuit for terminating line spacing is as follows: line 300 (Fig. 6i), common wire 424, contact sector 401, units arm 400, segment 402 #1, wire 425, contacts 11L, a plug wire to the "9" socket (Fig. 6j), contacts 9C, wire 351, relay contacts CN21a, wire 355 (Fig. 6k), normally closed group control contacts CN33b, CN32b and CN31b, interlock contacts CN46a, pickup coil CN42, wire 308, switch relay contacts CN34a and line 301. Relay CN42 then closes the holding contacts CN42a.

Relay CN42 has its holding coil in series with the contact CN49b already mentioned as closed in connection with starting operations to prevent line spacing during such starting operations. The starting condition circuit for relay CN42 is from line 300 (Fig. 6k), wire 313, contacts CN49b, holding coil CN42, wire 308, contacts CN34a and line 301. This holding relay CN42 is also in series with printing control cam contacts PM—C2. The running condition holding circuit includes line 300 (Fig. 6m), wire 428 (Fig. 6k), cam contacts PM—C2, holding contacts CN42a, coil CN42, wire 308, contacts CN34a and line 301. These cam contacts PM—C2 open right after printing operation so as to allow resumption of spacing to bring the sheet to the new recording position. Directly after one recording operation takes place, the holding coil of relay CN42 is deenergized so that relay R37 may again be effective to resume spacing by calling in the line spacing magnet LSM.

Operated in connection with the operation of the line stopping control relay CN42 is an interlock relay CN46 for preparing the pickup coil of the line stop relay for operation and also for cutting out operation of this pickup circuit to prevent it from being sustained longer than necessary. In Fig. 6k it is noted that relay CN46 is in series with contacts CN42b and printer cam contacts PM—C1. These PM contacts open earlier than the other printer contacts PM—C2 and remain open slightly longer. Upon closure of cam contacts PM—C1, relay CN46 is energized and serves to open the related contacts CN46a in series with the pickup coil of relay CN42. However, as soon as cam contacts PM—C2 open after printing, the related contacts CN42b in series with relay CN46 are opened to deenergize this interlock relay, and the related contacts CN46a are again closed in series with the line stop pickup relay CN42, so that it is again ready to terminate line spacing when the selectively plugged line number contact is reached by the dial relays and a circuit is directed through the code number contacts related thereto.

It will be noted that in the example selected which required spacing to the eleventh line, the units stepping relay USR (Fig. 6i) had to go through more than one cycle of operation. In other words, it was stepped through ten steps and then restored before moving to the 1 position for the second time. Upon reaching the tenth position, the units relay closes circuit connections for calling in the tens dial relay advance magnet TAM and also calling in other interlock relays for delaying or suspending operations until the units relay has time to restore back to the home position. It is noted that the tenth segment of the units relay has wire connections to relay CN43 as follows: line 300, wire 424, sector 401, arm 400, segment 401 #10, wire 429 (Fig. 6k), relay CN43, wire 308, contacts CN34a and line 301. When relay CN43 is energized, it closes associated contacts CN43a to call in a holding circuit including contacts CN41a which remain closed until the units relay contact arm 400 gets back to the home position. Upon energization of the restoring interlock relay CN43, contacts CN43b are also closed in series with the tens stepping relay advance magnet TAM. The circuit through magnet TAM includes the following connections: line 300 (Fig. 6k), wire 313, contacts CN43b, normally closed eject control relay contacts CN44b, magnet TAM, wire 308, contacts CN34a and line 301. Magnet TAM (Fig. 6j) then acts upon the contact arm 405 of the tens relay to advance it one step.

The normally closed contacts CN44b are shifted upon ejection operations, as described hereinafter, to call in the release magnet TRM of the tens stepping relay instead of connecting to the advance magnet of the same stepping relay.

Interlock relay CN43 has other related contacts for delaying the impulsing attending line spacing operations while the units relay is being restored. Referring to Fig. 6b, it is noted that contacts CN43c are in series with the pickup coil of a relay CN38. Upon the tenth spacing operation, when the line space magnet LSM is energized and the spacing mechanism causes closure of contacts 310 to cause stepping by magnet UAM to the tenth position, then contacts CN43c are effective to pick up relay CN38. The last mentioned relay has a holding coil with contacts CN38a in series therewith for sustaining the suspension of impulsing beyond the control of relay CN43. When the holding coil of relay CN38 operates, it also opens contacts CN38b (Fig. 6b) normally closed in series with the units stepping relay advance magnet UAM. Thus, the units stepping relay USR upon moving to the tenth position delays reception of impulses for further advance movement thereof, while it is being restored.

When the units stepping relay USR (Fig. 6*i*) is fully restored, then the mechanically operated contacts 404 are closed in series with a relay CN37 for terminating operation of the interlock described hereinbefore. The terminating circuit includes line 300 (Fig. 6*k*), wire 313, contacts 404, home position relay CN37, wire 308, contacts CN34*a* and line 301. This relay CN37 has control over contacts CN37*a* in series with another relay CN41 which, it will be remembered, has normally closed contacts CN41*a* in series with the restore interlocking relay CN43. When relay CN41 operates, due to the return of the units relay to the home position, it opens contacts CN41*a* to break the control of relay CN43.

The home detection relay CN37 has other contacts CN37*b* (Fig. 6*k*) in series with wire 430 and the "zero" set of horizontal line number contacts (Fig. 6*i*), thus making these contacts effective in the absence of a "0" dial segment in the units stepping relay USR. Any line selection involving line number contacts 0, 10, 20, etc. will have a control circuit, a part of which runs from line 300 (Fig. 6*k*), wire 313, contacts CN37*b*, wire 430 (Fig. 6*i*), etc.

The line selection devices may be plugged also to effect control upon occurrence of major, intermediate or minor group changes instead of upon the sensing of a particular group number. In Fig. 6*e* it was already noted that the usual holding relays R61, R67 and R73 of the minor, intermediate and major controls, respectively, have connected in parallel therewith special relays CN31, CN32 and CN33. In Fig. 6*k* it is noted that these three relays have related contacts CN31*c*, CN32*c* and CN33*c* connected between the plug sockets MI—L, INT—L, and MA—L, and the wire leading to the line stop control relay CN42. One or more plug connections to the line number contacts may be made from each of the multiple plug sockets and they will control spacing in the order of line occurrence and group change division and distribution. The usual listing and tabulating control by code numbers over line stoppage passes through the lower sets of contacts CN31*b*, CN32*b* and CN33*b*. However, upon occurrence of any of the three group changes and line selection control plugging from the related plug socket to a particular line number contact selection socket, then control is exercised for calling in the stopping relay CN42 jointly as controlled by a particular group change and also as controlled by a selected number of line spacing operations. Taking, for example, the occurrence of a minor group change and the selection therewith of line number 26, then the following circuit will be established after the last item of the previous group is printed, cam contacts PM—C2 open and then line spacing is permitted because at the same time, contacts CN49*b* are opened by the energization of relay CN49. The circuit is set up after spacing is accomplished to the 26th line and prior to the recording of the minor group: line 300 (Fig. 6*i*), wire 424, sector 401, arm 400 on segment 402 #6 the third time, wire 431, contacts 26L and the connected plug socket and a plug wire to socket MI—L (Fig. 6*k*), switch MS, minor change contacts CN31*c*, interlock contacts CN46*a*, pickup coil CN42, wire 308, contacts CN34*a* and line 301. Since the 26th line is already reached when this circuit is completed, relay CN42 by opening contacts CN42*c* (Fig. 6*b*) is effecting the desired control by stopping the record sheet in the position to receive recording of the minor group. Similar circuits may be presented upon differing group change operations following in direct succession or upon group changes that are spaced by intervening item recordings.

Recording on a sheet is terminated by a sheet ejection operation which is effected automatically or operated manually following the end of a run of cards. When the control is to be effected automatically, the eject control relay CN40 (Fig. 6*k*) is plugged to certain line number contacts which represent a line usually near the bottom of a sheet or the end of a form. When the spacing operations have progressed far enough to reach such a line, say line 99, then the following circuit is effected through relay CN40: line 300 (Fig. 6*i*), wire 424, sector 401, arm 400, segment 402 #9, wire 435, contacts 99L, the connected plug socket and a plug wire to socket 436 (Fig. 6*k*), relay CN40, wire 308, contacts CN34*a* and line 301. Relay CN40 then operates to close contacts CN40*a* in series with an eject control relay CN45. Referring to Fig. 6*c*, it is seen that this relay CN45 operates contacts CN45*a* in series with the usual sheet ejection magnet EM for operating the mechanism shown in Fig. 5. A special eject circuit may be traced as follows: line 300 (Fig. 6*c*), eject contacts #6, post 12, wire 437, relay contacts CN45*a*, wire 438, cam contacts CB33, upper contacts CN39*d* of the release key relay, eject magnet EM and wire 439 to line 301. Magnet EM then operates (Fig. 5) to connect clutch 197, 198 so that the eject sector 220 is rocked clockwise to rotate the platen shaft to an extent predetermined by a setting of the usual controls of the automatic carriage of Patent 2,189,025.

Upon operation of the eject magnet EM (Fig. 6*c*) during line selecting operation, the pickup coil CN44 of another control relay is called into operation by a shunt circuit including the contacts CN34*c* of the line selection switch relay already mentioned. Relay CN44 then closes contacts CN44*a* in series with a holding coil of the same relay. This holding coil is energized by a circuit through the normally closed contacts of the eject interlock relay R31 (Fig. 6*b*). The circuit includes line 300 (Fig. 6*c*), wire 441 (Fig. 6*b*), wire 442, right contacts R31*a*, wire 443 (Fig. 6*c*), relay contacts CN44*a*, holding coil CN44, wire 439 and line 301. Relay CN45 also has a holding coil associated with the eject circuit connections and called in by closure of contacts CN45*b*. This relay is held energized by the following circuit connections until ejection is started: line 300, eject contacts #6 opened by ejection, post #12, wire 445, contacts CN45*b*, holding coil CN45, wire 439 and line 301.

Referring back to Fig. 6*k*, it is noted that relay CN44 has contacts CN44*d* in series with the restoring relay CN43 and it is through these contacts that the restoring relay is called into operation at any point upon the selection of an eject cycle to restore both of the stepping relays USR and TSR. This is done through the contacts CN43*b* which serve to direct a circuit through the units relay restore magnet URM through the lower contacts CN39*a* of relay CN39 and, at the same time, since the contacts CN44*c* are shifted to close, the tens stepping relay TSR is restored by operation of the magnet TRM.

In the foregoing section, it was assumed that the eject operation was called in automatically by selective plugging into the line selection contacts. Now it will be explained how the same sort of eject control can be selected manually by operation of the release key (Fig. 6l) and closure of contacts RK in series with the manual restore relay CN39. The circuit for relay CN39 involves line 300, contacts RK, relay CN39, wire 347 and line 301.

Turning to Fig. 6c, it is noted that relay CN39 controls a set of contacts CN39d and CN39e in series with the eject control magnet EM. When the key control magnet CN39 is effective, it connects the eject magnet EM through contacts CN39e to the other side of the line and the circuit may be traced as follows: line 300, contacts #6, post #12, wire 445, contacts CN39e, magnet EM, wire 439 and line 301.

This restore key control is effective also for restoring the two stepping dial relays. Referring to Fig. 6k, it is seen that the upper set of contacts CN39b is connected to the release magnet URM of the units stepping relay. Another pair of contacts CN39c is connected directly to the tens release magnet TRM. Operation of the restore key closes both sets of contacts and thereby causes resetting of the stepping relays along with the manual ejection operation, as well as along with the automatic eject operation.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a record feeding device, a line spacing mechanism, stepping relay means, contacts associated with said relay means, means under control of said mechanism for operating said contacts to carry an impulse to said relay means for each spacing operation, a set of line selection contacts, means under control of said relay means for rendering said selection contacts effective seriatim, means for preparing certain of said contacts for spacing control, and means cooperating with any of said selection contacts and effective to stop said line spacing mechanism upon said certain contacts becoming effective for predetermining the extent of feeding of the record.

2. A device according to claim 1, wherein said relay means is connected to energize seriatim a plurality of tens order denominational relays each related to a set of digital banks of said line selection contacts, and means under control of a lower order relay upon operation of ten steps for operating the next higher order relay one step to select the next digital bank of contacts.

3. A device according to claim 1, wherein the last mentioned means comprises a set of code number contacts, any of which is suited for connection to any of said line selection contacts by said preparing means, and automatic means for making said code number contacts effective in a predetermined order to operate said stop means and space the record to selected lines in a predetermined order.

4. A device according to claim 1, wherein the last mentioned means comprises a set of code number contacts, a plurality of impulse emitters, a plurality of denominational banks of code number relays connected separately to said emitters for control over said code number contacts, a control record with code number indicia, means for sensing said indicia, connections between said sensing means and said emitters, holding relays operated under control of said code number relays, means under control of said holding relays for selectively closing certain of said code number contacts, and pluggable connections between any of said code number contacts and any of said line selection contacts, whereby the code number indicia on a series of said control records determine line selection.

5. A device according to claim 1, wherein said relay means is connected to energize seriatim a plurality of tens order denominational relays each related to a set of digital banks of said line selection contacts, means under control of a lower order relay upon operation of ten steps for operating the next higher order relay one step to select the next digital bank of contacts, means for restoring the lower order relay, and means for calling said restoring means into operation upon operation of ten steps, and means under control of the last mentioned means for delaying the operation of said impulse carrying means during the operation of said relay restoring means.

6. A device according to claim 1, wherein said relay means is connected to energize seriatim a plurality of tens order denominational relays each related to a set of digital banks of said line selection contacts, means under control of a lower order relay upon operation of ten steps for operating the next higher order relay one step to select the next digital bank of contacts, means for restoring the lower order relay, and means for calling said restoring means into operation upon operation of ten steps, and means under control of the last mentioned means for delaying the operation of said impulse carrying means during the operation of said relay restoring means, and wherein the lower order relay closes contacts when in the home position, a relay called into operation by closure of the last mentioned contacts, and means under control of said home relay for terminating the control of said delaying means.

7. A device according to claim 1, wherein said relay means is connected to energize seriatim a plurality of tens order denominational relays each related to a set of digital banks of said line selection contacts, and means under control of a lower order relay upon operation of ten steps for operating the next higher order relay one step to select the next digital bank of contacts, and wherein said relay means comprise restoring means cooperating with the denominational relays, a record ejecting means, means for calling said ejecting means into operation when said record is advanced near the end of a form, and means under control of said ejecting means for operating said relay restoring means.

8. In a machine controlled by records bearing data indicia and code number indicia, means for sensing said indicia, means under control of said sensing means for recording the data on a record sheet, a sheet spacing means for advancing said sheet between printing operations, a spacing control means for predetermining the stopping positions of said advancing means, a code number storing means, means for establishing a predetermined relationship between said code number storage means and said spacing control means to cause stopping of the sheet at certain lines under control of the sensed code number indicia of certain numbers, and means under control of said sensing means for establishing operations of said code number storage means under control of the records.

9. The combination set forth in claim 8, wherein the spacing control means comprises a plurality of pluggable contacts arranged in horizontal rows and vertical columns according to digital and denominational values, and means under control of said sheet spacing means for making said contacts effective seriatim in synchronism with the advance of the record sheet.

10. The combinations set forth in claim 8, wherein the code number storage means comprises a plurality of pluggable contacts arranged in horizontal rows and vertical columns according to digital and denominational values, and means under control of the code number sensing means for making said contacts effective according to the code number sensed on a record.

11. In a machine controlled by records bearing data indicia and code number indicia, means for sensing said indicia, means under control of said sensing means for recording the data on a record sheet, a sheet spacing means for advancing said sheet between printing operations, a spacing control means for predetermining the stopping positions of said advancing means, a code number storing means, means under control of said sensing means for establishing operations of said code number storage means under control of the records, wherein the spacing control means comprises a plurality of pluggable contacts arranged in horizontal rows and vertical columns according to digital and denominational values, means for establishing a predetermined relationship between said code number storing means and said spacing control means including connections from any of said code number storing means to any of said line selection contacts, means under control of said sheet spacing means for making said contacts effective seriatim in synchronism with the advance of the record sheet comprising a plurality of stepping relays of different denominational order, the lower order stepping relay being connected to said line selection contacts seriatim in digital order and the higher order one of said stepping relays being connected to means for selecting denominational groups of said line selection contacts seriatim, an impulsing means coordinated with said sheet advancing means, means under control of said impulsing means for operating the lower order stepping relays in synchronism with the advance movement of said sheet, means under control of the lower order stepping relay for advancing the higher order stepping relay one unit for each ten steps of movement, and means under control of said establishing means for operating said spacing control stopping means cooperating with said sheet advancing means to locate said sheet in predetermined record receiving positions according to a predetermined schedule of operation.

12. In a machine controlled by records bearing data indicia and code number indicia, means for sensing said indicia, means under control of said sensing means for recording the data on a record sheet, a sheet spacing means for advancing said sheet between printing operations, a spacing control means for predetermining the stopping positions of said advancing means, a code number storing means, means under control of said sensing means for establishing operations of said code number storage means under control of the records, wherein the code number storage means comprises a plurality of pluggable contacts arranged in horizontal rows and vertical columns according to digital and denominational values, means for establishing a predetermined relationship between said code number storing means and said spacing control means with electrical connections between said pluggable contacts and said spacing control means, means under control of the code number sensing means for making said contacts effective according to the code number sensed on a record, a plurality of commutator impulse emitters, means for operating said emitters in synchronism with the advance of said records, a plurality of digital and denominational relays connected to said emitters, means under control of said code number sensing means for directing impulses into said emitters to select certain of said relays in accordance with the code number indicia on the records, means under control of said code number relays for operating said code number contacts, and means for stopping said sheet advancing means when the closure of the code number contacts coincides with the selected position of the advancing control means, whereby the sheet is advanced predetermined amounts between the recording operations according to predetermined relationships between code numbers and lines on the sheet.

13. In a machine controlled by records bearing data indicia and group number indicia arranged according to minor, intermediate and major classifications, means for sensing the indicia on said records, printing devices, means under control of said sensing devices for operating said printing devices, group control devices, means under control of said sensing means for operating said group control devices, a line spacing means for advancing said sheet between printing operations, a sheet advancing control means operated in synchronism with said line spacing means and settable to represent the advance of the sheet to each recording line, means for stopping said line spacing means, a series of three electrical switches in series with said line space stopping means, means under control of said group control devices for separately controlling said switches according to minor, intermediate and major group changes in the record groups, and means for connecting said switching means separately to said sheet advancing control means to select predetermined lines to determine predetermined sheet positions selected by predetermined group changes.

14. The combination set forth in claim 13, wherein said sheet advancing control means comprises a set of contacts arranged according to digital denominational values, and means under control of the line spacing means for making said contacts effective seriatim.

15. In a record feeding device, a line spacing means, a set of contacts representative of line selection positions and arranged in horizontal rows and vertical columns according to digital denominational values, means for selecting said contacts seriatim under control of said line spacing means, means for ejecting said record with a long feeding operation, ejection control means comprising electrical connections to any of said contacts, whereby the record ejection operation is caused by the appearance of a predetermined record line space position.

16. The combination set forth in claim 15, comprising a restoring key, and means under control of said key for calling said ejection control means into operation.

17. The combination set forth in claim 15, wherein the said contact selecting means comprises a plurality of stepping relays and tens denominational relays controlled by one of said stepping relays for operating successive vertical columns of said contacts seriatim, means for restoring said stepping relays, and means under control of said ejection control means for operating said stepping relay restoring means.

18. A machine controlled by records arranged in groups and bearing data indicia and group number indicia, means for sensing said indicia, means under control of said sensing means for printing the data on the record sheet, means for line spacing said sheet, a set of line selection contacts arranged according to digital and denominational values, means for operating said contacts seriatim in synchronism with the operation of said line spacing means, a set of group number contacts also arranged according to digital and denominational values, means under control of said sensing means for selecting said group number contacts according to the group number indicia on a sensed record, a line selection control means to effect spacing to predetermined lines, and means for plugging said control means in series with pairs of certain line selection contacts and group number contacts, whereby data of any group can be recorded on any line.

19. The combination set forth in claim 18, further characterized by the provision of adding control devices for adding the data of different groups, total taking devices, means for operating said recording means under control of said total taking devices, whereby the recording of items and totals of different groups is made on predetermined lines at variance with the order of the group numbers and the values of the group numbers.

20. In a machine of the kind set forth in claim 11, said code number storing means comprising a plurality of pluggable contacts and means under control of the code number sensing means for making said contacts effective according to the code number sensed on a record, including the provision of means for plugging said line spacing stopping control means in series with a plurality of pairs of selected line selection contacts and code number contacts, whereby data of any code number groups can be recorded on any lines.

21. In a record sheet feeding device, a line spacing mechanism, a sheet advance control means including a plurality of stepping relays, means for operating said relays of the control means in synchronism with the said spacing mechanism, a record sheet ejecting mechanism for long feeding, means for calling said ejecting mechanism into operation, means under control of said sheet advance control means for operating said ejection calling means at any predetermined line, and means under control of said ejection calling means for restoring said relays upon an ejection operation.

ALTON P. TAYLOR.

REFERENCES CITED

The following references are of record in the file of this patent:

UNITED STATES PATENTS

| Number | Name | Date |
|---|---|---|
| 2,348,059 | Daly | May 2, 1944 |
| 2,531,885 | Mills et al. | Nov. 28, 1950 |

FOREIGN PATENTS

| Number | Country | Date |
|---|---|---|
| 521,716 | Great Britain | May 29, 1940 |